US012654778B1

(12) United States Patent
Taylor et al.

(10) Patent No.: US 12,654,778 B1
(45) Date of Patent: Jun. 16, 2026

(54) VEHICLE WITH ARMORED HOOD

(71) Applicant: Oshkosh Defense, LLC, Oshkosh, WI (US)

(72) Inventors: Jeff Taylor, Oshkosh, WI (US); Tim Booms, Oshkosh, WI (US)

(73) Assignee: Oshkosh Defense, LLC, Oshkosh, WI (US)

( * ) Notice: Subject to any disclaimer, the term of this patent is extended or adjusted under 35 U.S.C. 154(b) by 701 days.

(21) Appl. No.: 18/086,574

(22) Filed: Dec. 21, 2022

Related U.S. Application Data

(60) Provisional application No. 63/293,048, filed on Dec. 22, 2021.

(51) Int. Cl.
| | |
|---|---|
| *B62D 25/12* | (2006.01) |
| *E05D 3/04* | (2006.01) |
| *E05D 11/06* | (2006.01) |
| *E05D 11/10* | (2006.01) |
| *E05F 1/10* | (2006.01) |
| *F41H 7/04* | (2006.01) |

(52) U.S. Cl.
CPC .............. *B62D 25/12* (2013.01); *E05D 3/04* (2013.01); *E05D 11/06* (2013.01); *E05D 11/1007* (2013.01); *E05F 1/1008* (2013.01); *F41H 7/04* (2013.01); *E05Y 2201/484* (2013.01); *E05Y 2900/504* (2013.01); *E05Y 2900/536* (2013.01)

(58) Field of Classification Search
CPC ......... E05Y 2900/536; E05Y 2900/504; E05Y 2201/484; B62D 25/12; E05D 3/04; E05D 11/06; E05D 11/1007
See application file for complete search history.

(56) References Cited

U.S. PATENT DOCUMENTS

| | | | | | |
|---|---|---|---|---|---|
| 2,547,550 | A | * | 4/1951 | Whitmore | E05D 11/1028 |
| | | | | | 16/306 |
| 2,703,430 | A | * | 3/1955 | Thomas | E05F 1/1215 |
| | | | | | 16/306 |
| 6,161,867 | A | * | 12/2000 | Tamura | B60R 19/12 |
| | | | | | 180/69.1 |
| 8,800,703 | B2 | * | 8/2014 | Miller | B62D 25/10 |
| | | | | | 180/69.2 |
| 9,016,773 | B2 | * | 4/2015 | Tanner | E05D 11/10 |
| | | | | | 296/193.11 |
| 10,267,075 | B2 | * | 4/2019 | Kenyon | E05D 3/02 |
| 12,454,319 | B1 | * | 10/2025 | Taylor | B62D 25/105 |
| 12,486,704 | B2 | * | 12/2025 | Mankar | E05F 1/1215 |

(Continued)

FOREIGN PATENT DOCUMENTS

| | | | | |
|---|---|---|---|---|
| CN | 201545084 | U | * | 8/2010 |
| CN | 208416240 | U | * | 1/2019 |

(Continued)

*Primary Examiner* — Emma K Frick
(74) *Attorney, Agent, or Firm* — Foley & Lardner LLP

(57) ABSTRACT

A vehicle includes a chassis, a tractive element coupled to the chassis, a hood, and a hinge assembly pivotally coupling the hood to the chassis. The hinge assembly includes a first plate fixedly coupled to the hood, the first plate defining a first hinge pin aperture, a second plate coupled to the chassis, the second plate defining a second hinge pin aperture, a hinge pin extending through the first hinge pin aperture and the second hinge pin aperture, and a spring configured to bias the hood toward a raised position.

19 Claims, 28 Drawing Sheets

(56) References Cited

U.S. PATENT DOCUMENTS

2009/0106938 A1 *  4/2009  Mori ........................ E05F 1/004
                                                16/277
2010/0050383 A1 *  3/2010  Wang ..................... F16M 11/10
                                                16/297
2025/0188782 A1 *  6/2025  Mankar ................. E05F 1/1016

FOREIGN PATENT DOCUMENTS

CN        111005640 A  *  4/2020  ............ E05F 1/1238
FR          2943375 A1 *  9/2010  ............ F41H 5/223
GB          2564705 A  *  1/2019  ............ E05D 11/00
JP    WO2006129555 A1 * 12/2008  ............ H04M 1/022
KR     20190112397 A  * 10/2019  .......... E05C 17/305
RU           184886 U1 * 11/2018  ............ B62D 25/00

* cited by examiner

VEHICLE WITH ARMORED HOOD

CROSS-REFERENCE TO RELATED PATENT APPLICATION

This application claims the benefit of and priority to U.S. Provisional Application No. 63/293,048, filed Dec. 22, 2021, the entire disclosure of which is incorporated by reference herein.

BACKGROUND

Military vehicles are often utilized in combat situations where the vehicles may be targeted with projectiles or explosives. As such, various components of the vehicles may be configured to be resistant to such damage.

SUMMARY

At least one embodiment relates to a vehicle including a chassis, a tractive element coupled to the chassis, a hood, and a hinge assembly pivotally coupling the hood to the chassis. The hinge assembly includes a first plate fixedly coupled to the hood, the first plate defining a first hinge pin aperture, a second plate coupled to the chassis, the second plate defining a second hinge pin aperture, a hinge pin extending through the first hinge pin aperture and the second hinge pin aperture, and a spring configured to bias the hood toward a raised position.

Another embodiment relates to a vehicle including a chassis, a tractive element coupled to the chassis, a hood, and a hinge assembly. The hinge assembly includes a frame member removably coupled to the chassis, a first plate fixedly coupled to one of the hood or the frame member, the first plate defining a first hinge pin aperture and a first locking pin aperture, a second plate fixedly coupled to the other of the hood or the frame member, the second plate defining a second hinge pin aperture and a second locking pin aperture, a torsion spring including a first leg and a second leg, a hinge pin extending through the first hinge pin aperture, the second hinge pin aperture, and the torsion spring, a support coupled to at least one of the hood or the frame member and coupled to an end portion of the hinge pin such that the torsion spring extends between the second plate and the support, a first stop coupled to the hood, a second stop coupled to the frame member, and a locking pin configured to be received by the first locking pin aperture and the second locking pin aperture to selectively limit movement of the hood relative to the chassis. The first leg engages the first stop and the second leg engages the second stop such that the torsion spring biases the hood toward a raised position.

Another embodiment relates to a hinge assembly for pivotally coupling a hood to a chassis of a vehicle. The hinge assembly includes a frame member, a first support fixedly coupled to the frame member, the first support defining a first hinge pin aperture, a second support defining a second hinge pin aperture, a hinge pin extending through the first hinge pin aperture and the second hinge pin aperture to pivotally couple the first support to the second support, and a torsion spring extending around the hinge pin. The torsion spring is coupled to the frame member and configured to apply a biasing torque on the second support.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle of the present disclosure (e.g., a military vehicle, etc.) includes a repositionable hood assembly. The hood assembly includes a grille that is fixed to a frame of the vehicle and a hood that is pivotally coupled to the frame by a pair of hinge assemblies. Each hinge assembly includes a center plate that is coupled to the hood and a pair of side plates that are coupled to the frame. A hinge pin extends through the center plate and the side plates, pivotally coupling the hood 810 to the frame. A pair of torsion springs extend around the hinge pins and apply a biasing force to raise the hood. The ends of the hinge pin are each supported by a support plate that is also coupled to the frame.

Overall Vehicle

Figure 1:
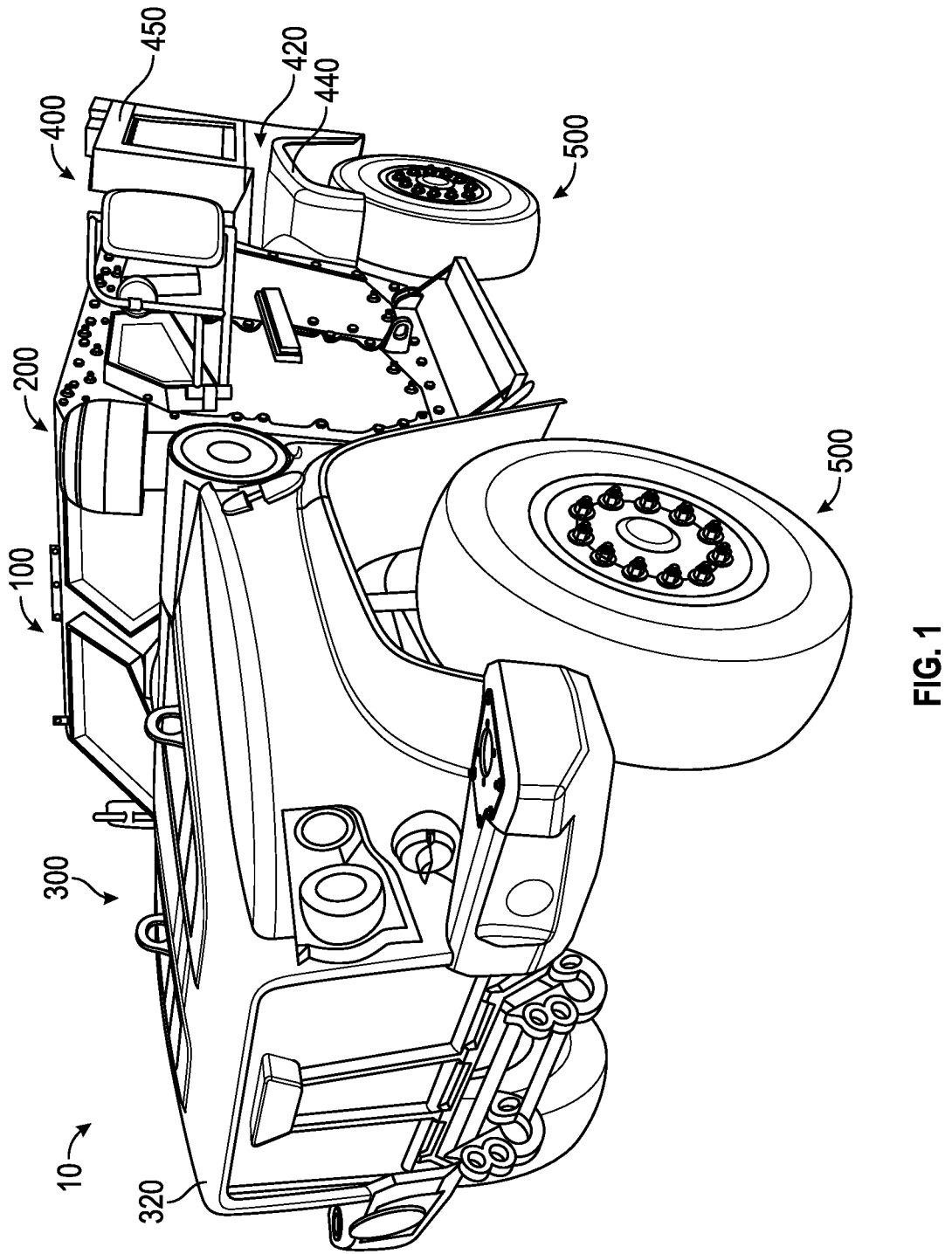
FIG. 1 is a front perspective view of a vehicle in an A-Kit configuration including a hood, according to an exemplary embodiment.
Figure 2:
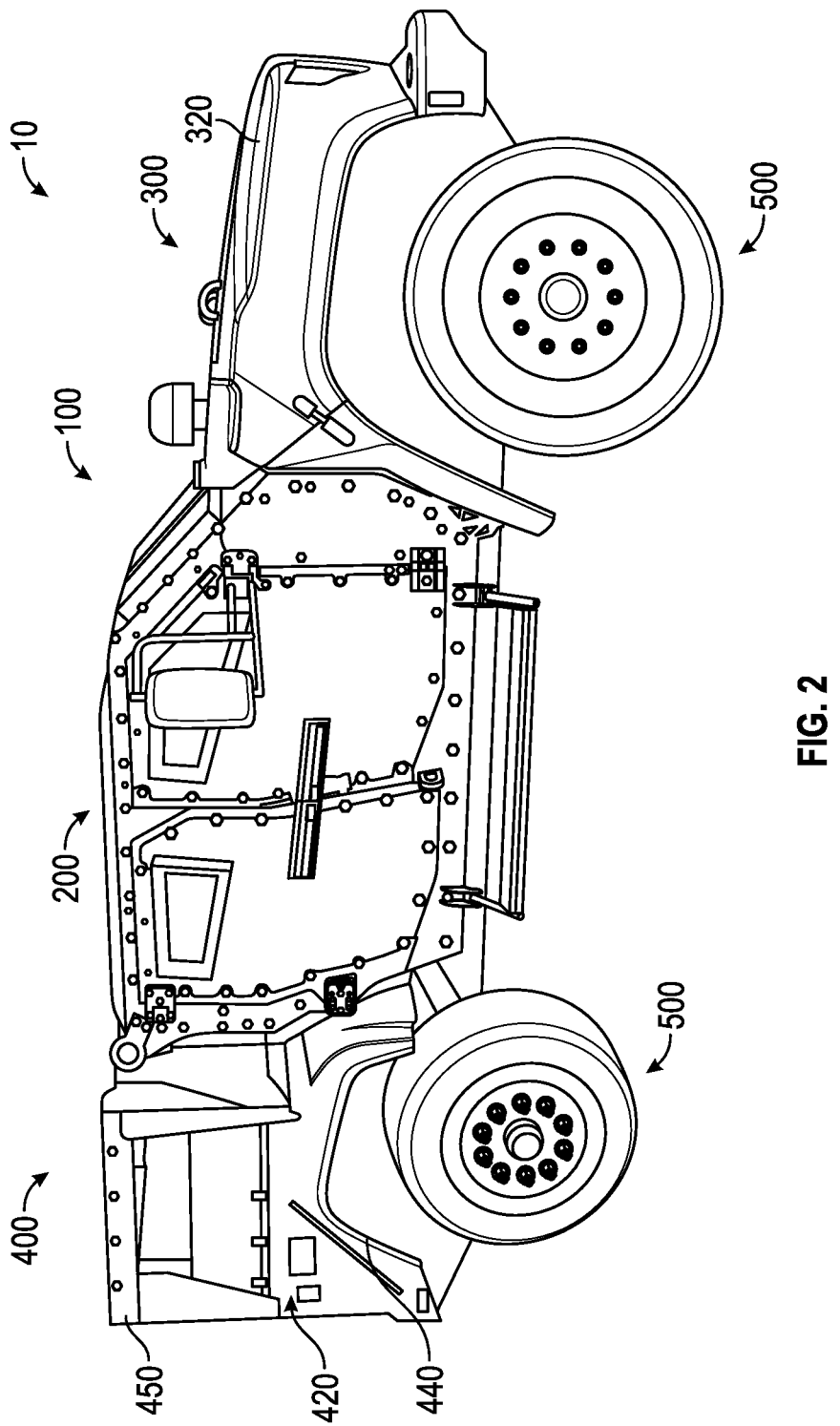
FIG. 2 is a side view of the vehicle of FIG. 1, according to an exemplary embodiment.
Figure 3:
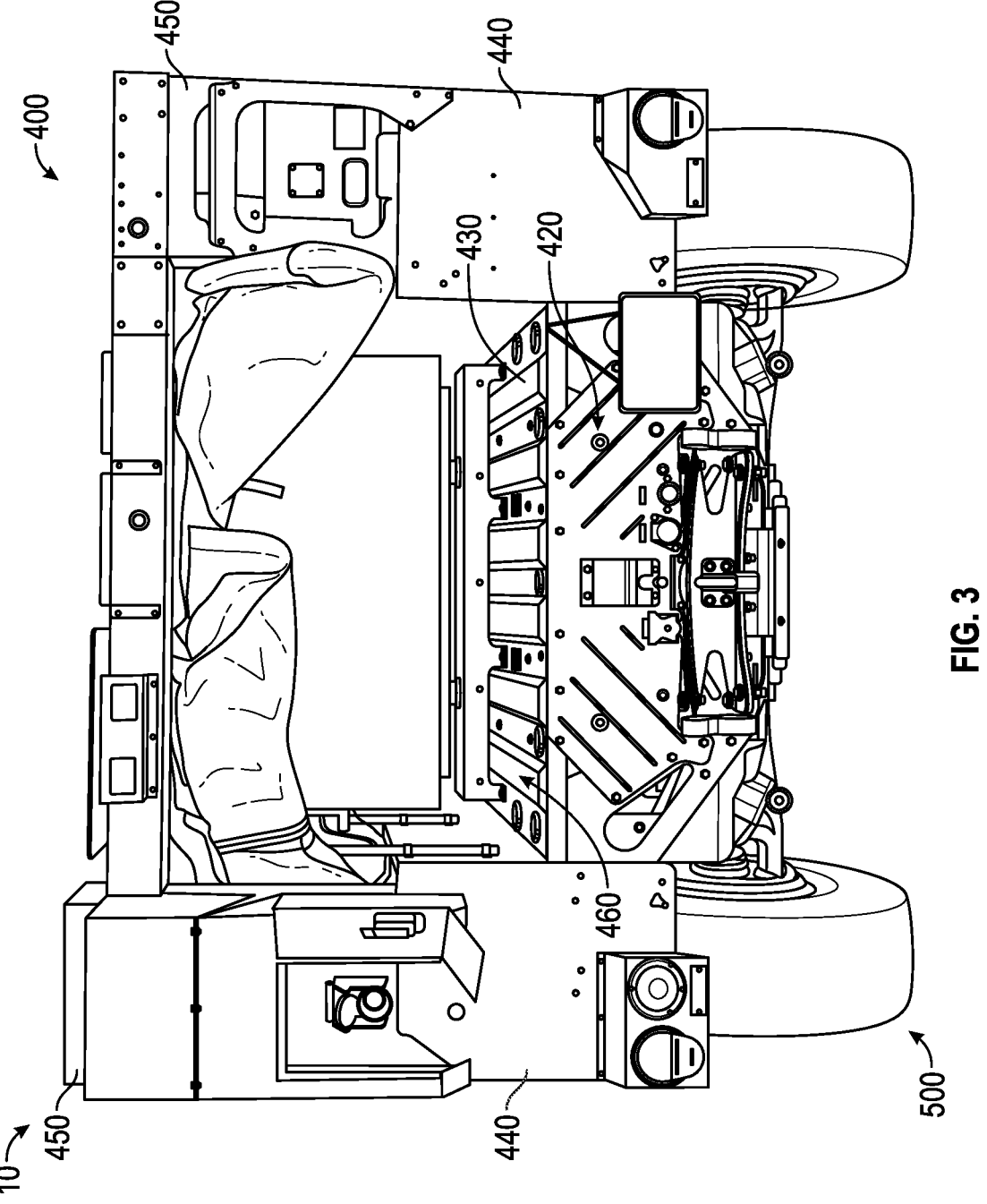
FIG. 3 is a rear view of the vehicle of FIG. 1, according to an exemplary embodiment.

According to the exemplary embodiment shown in FIGS. 1-3, a machine, shown vehicle 10, is configured as a military vehicle. In the embodiment shown, the military vehicle is a joint light tactical vehicle ("JLTV"). In other embodiments, the military vehicle is another type of military vehicle (e.g., a medium tactical vehicle, a heavy tactical vehicle, etc.). In an alternative embodiment, the vehicle 10 is another type of vehicle other than a military vehicle. For example, the vehicle 10 may be a fire apparatus (e.g., a pumper fire truck, a rear-mount aerial ladder truck, a mid-mount aerial ladder truck, a quint fire truck, a tiller fire truck, an airport rescue fire fighting ("ARFF") truck, etc.), a refuse truck, a concrete mixer truck, a tow truck, an ambulance, a farming machine or vehicle, a construction machine or vehicle, and/or still another vehicle.

As shown in FIGS. 1-9, the vehicle 10 includes a chassis assembly, shown as hull and frame assembly 100, including a passenger cabin, shown as passenger capsule 200, a first module, shown as front module 300, a second module, shown as rear module 400; a plurality of axle assemblies (e.g., including axles, differentials, wheels, brakes, suspension components, etc.), shown as axle assemblies 500, coupled to the front module 300 and the rear module 400; and a first electrified driveline arrangement (e.g., a powertrain, a drivetrain, including an accessory drive, etc.), shown as driveline 600.

According to an exemplary embodiment, the vehicle 10 is an armored vehicle (e.g., to be resistant to explosions or other impacts). In some embodiments, the passenger capsule 200 provides a robust and consistent level of protection by using overlaps to provide further protection at the door interfaces, component integration seams, and panel joints. The passenger capsule 200 may be manufactured from high hardness steel, commercially available aluminum alloys, ceramic-based SMART armor, and/or other suitable materials to provide a 360-degree modular protection system with two levels of underbody mine/improvised explosive device ("IED") protection. The modular protection system provides protection against kinetic energy projectiles and fragmentation produced by IEDs and overhead artillery fire. The two levels of underbody protection may be made of an aluminum alloy configured to provide an optimum combination of yield strength and material elongation. Each protection level uses an optimized thickness of this aluminum alloy to defeat underbody mine and IED threats.

According to an exemplary embodiment, the passenger capsule 200 is a structural shell that forms a monocoque hull structure. Monocoque refers to a form of vehicle construction in which the vehicle body and chassis form a single unit. In some embodiments, the passenger capsule 200 includes a plurality of integrated armor mounting points configured to engage a supplemental armor kit (e.g., a "B-Kit," etc.). According to the exemplary embodiment shown in FIGS. 1,

2, 4, 5, and 9, the passenger capsule 200 accommodates four passengers in a two-by-two seating arrangement and has four doors mounted thereto. According to the alternative embodiment shown in FIG. 8, the passenger capsule 200 accommodates two passengers and has two doors mounted thereto.

Figure 4:
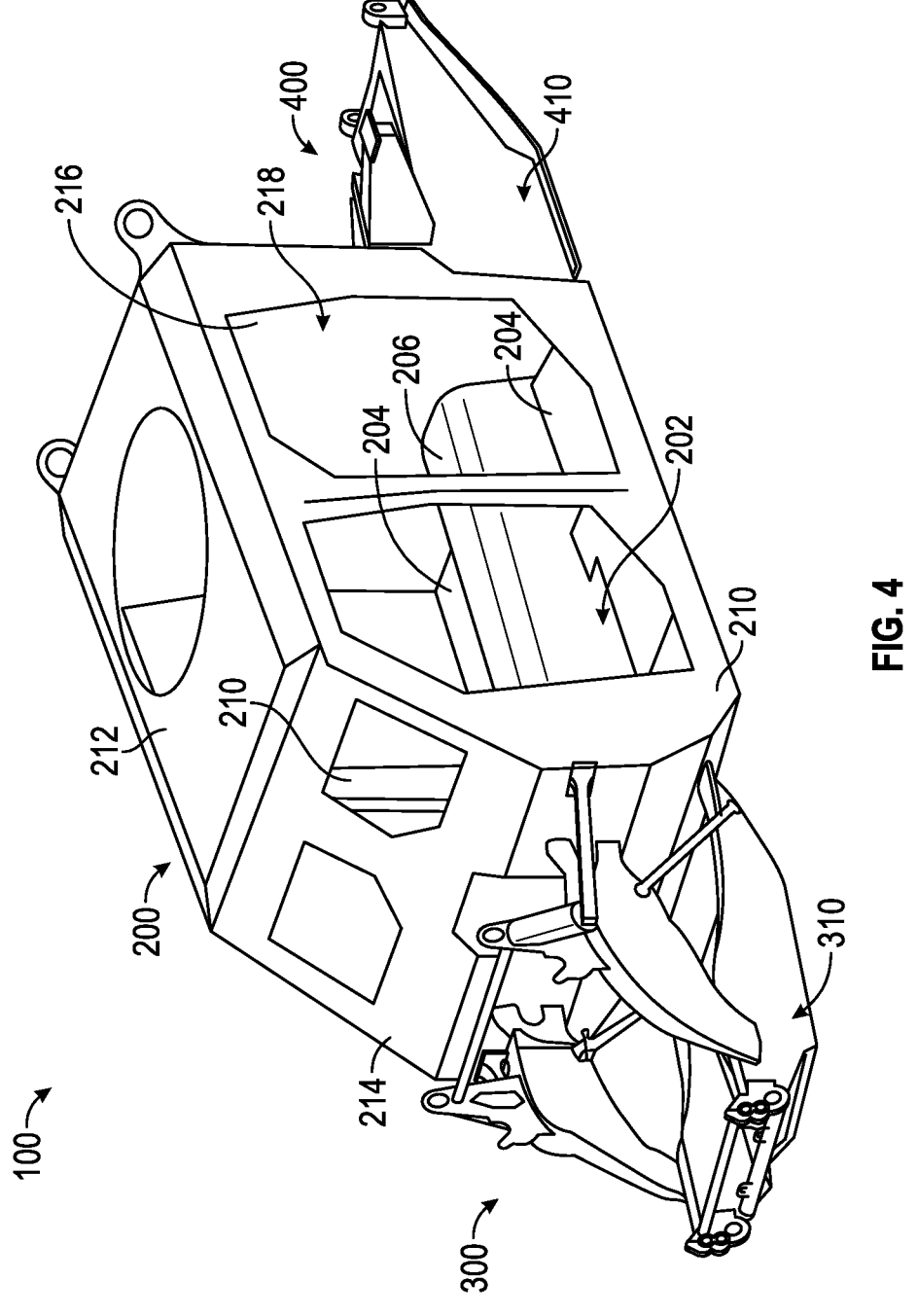
FIG. 4 is a perspective view of a chassis assembly of the vehicle of FIG. 1 including a passenger capsule, a front module, and a rear module, according to an exemplary embodiment.
Figure 5:
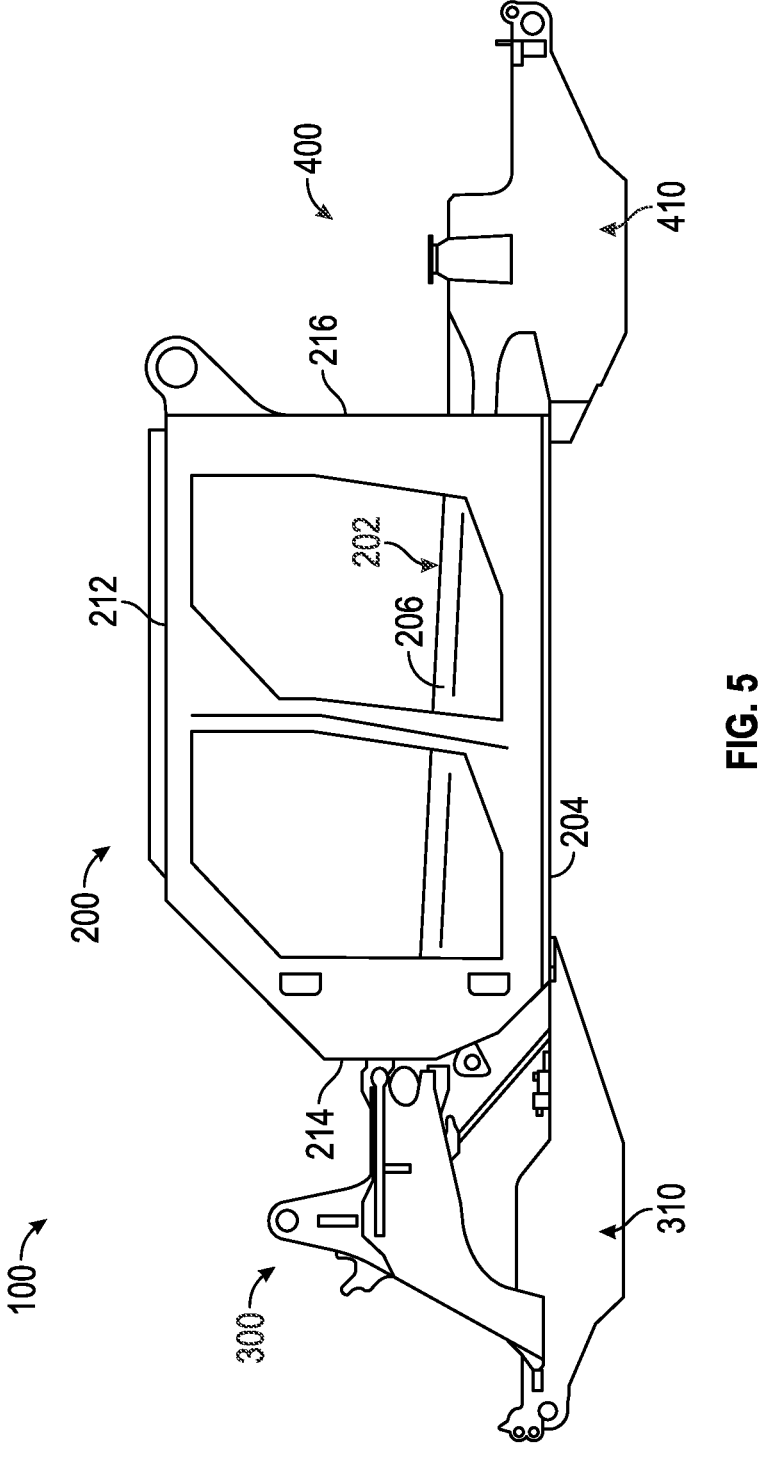
FIG. 5 is a side view of the chassis assembly of FIG. 4, according to an exemplary embodiment.
Figure 6:
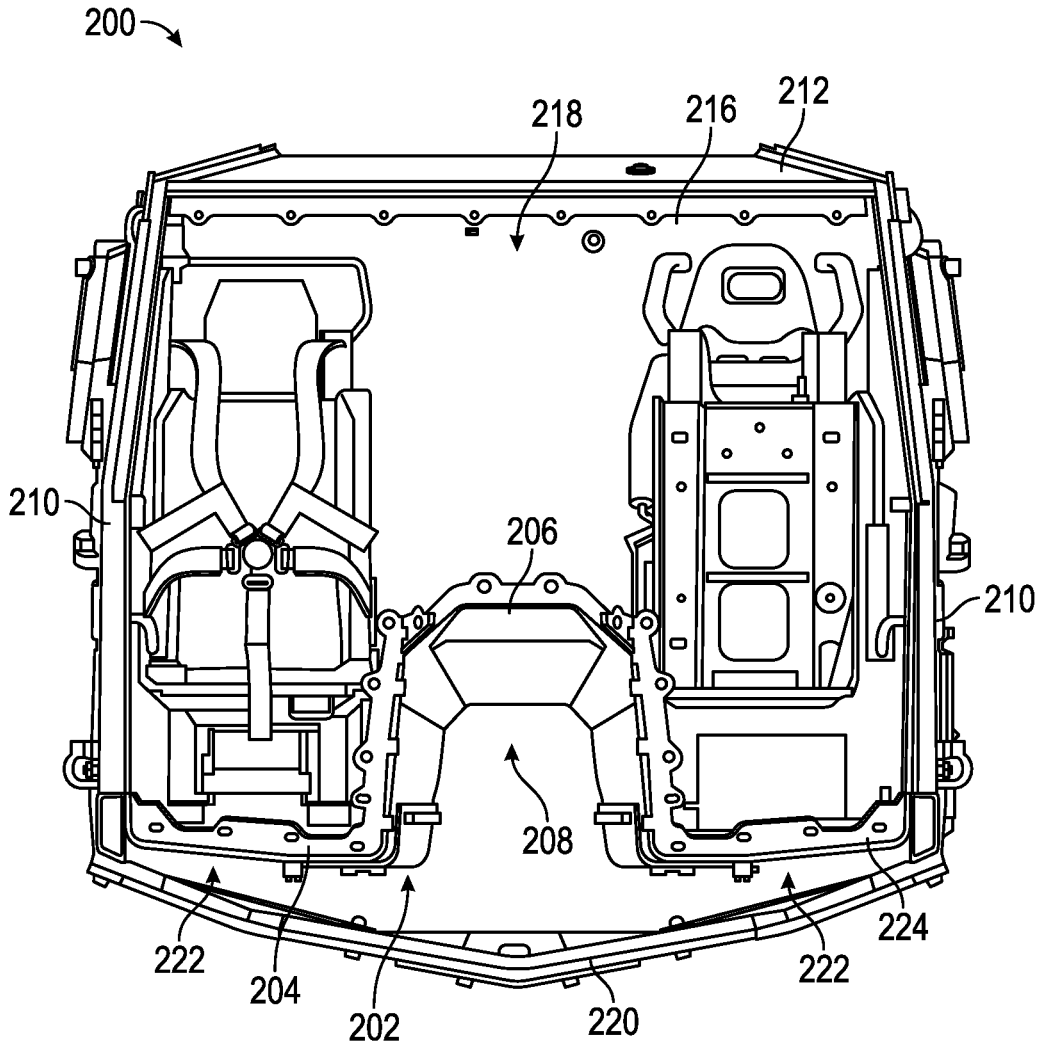
FIG. 6 is a cross-sectional view of the passenger capsule of FIG. 4, according to an exemplary embodiment.

As shown in FIGS. 4-6, the passenger capsule 200 includes a floor assembly, shown as floor assembly 202, having a pair of floor portions, shown as floor portions 204, laterally spaced apart and separated by a central tunnel, shown as structural tunnel 206, extending longitudinally along a centerline of the passenger capsule 200. According to an exemplary embodiment, for load purposes, the structural tunnel 206 replaces a frame or rail traditionally used in vehicle chassis. As shown in FIG. 6, the structural tunnel 206 (i) has an arcuately shaped cross-section that extends upward into an interior, shown as passenger compartment 218, of the passenger capsule 200 and (ii) defines a cavity or recessed space, shown as tunnel slot 208. The configuration of the structural tunnel 206 increases the distance between the ground and the passenger compartment 218 of the passenger capsule 200. Accordingly, the structural tunnel 206 may provide greater blast protection from IEDs located on the ground (e.g., because the IED has to travel a greater distance in order to penetrate the structural tunnel 206).

As shown in FIGS. 4-6, the passenger capsule 200 additionally includes a pair of side panels, shown as sidewalls 210, coupled to opposing lateral sides of the floor assembly 202; a top panel, shown as roof 212, coupled to the sidewalls 210 opposite the floor assembly 202; a front panel, shown as front wall 214, coupled to front ends of the floor assembly 202, the sidewalls 210, and the roof 212; and a rear panel, shown as rear wall 216, coupled to rear ends of the floor assembly 202, the sidewalls 210, and the roof 212. As shown in FIGS. 4 and 6, the floor assembly 202, the sidewalls 210, the roof 212, the front wall 214, and the rear wall 216 cooperatively define the passenger compartment 218.

As shown in FIG. 6, the passenger capsule 200 includes a belly deflector, shown as v-shaped belly deflector 220, coupled to bottom ends of the sidewalls 210 and across the bottom of the passenger capsule 200 beneath the floor assembly 202. According to an exemplary embodiment, the v-shaped belly deflector 220 is configured to mitigate and spread blast forces along the belly of the vehicle 10. As shown in FIG. 6, the v-shaped belly deflector 220 is spaced from the floor assembly 202 such that a space, shown as air gap 222, is formed between the floor portions 204 of the floor assembly 202 and the v-shaped belly deflector 220.

In some embodiments, the floor assembly 202, the sidewalls 210, the roof 212, the front wall 214, the rear wall 216, and the v-shaped belly deflector 220 are fabricated subassemblies that are bolted together to provide the passenger capsule 200. Such a modular approach to the passenger capsule 200 provides increased protection with the application of perimeter, roof, and underbody add on panels. The components of the passenger capsule 200 mitigate and attenuate blast effects, allow for upgrades, and facilitate maintenance and replacements.

As shown in FIGS. 4, 5, 7, 8, and 9, the front module 300 includes a first subframe assembly, shown as front subframe 310, and the rear module 400 includes a second subframe assembly, shown as rear subframe 410. The front subframe 310 includes a first plurality of frame members coupled to the floor assembly 202 and the front wall 214 of the passenger capsule 200 at a first plurality of interfaces. The rear subframe 410 includes a second plurality of frame members coupled to the floor assembly 202 and the rear wall 216 of the passenger capsule 200 at a second plurality of interfaces. Such interfaces may include, for example, a plurality of fasteners (e.g., bolts, rivets, etc.) extending through corresponding pads coupled to the front subframe 310, the rear subframe 410, and the passenger capsule 200. According to an exemplary embodiment, a front axle assembly of the axle assemblies 500 is coupled to the front subframe 310 and a rear axle assembly of the axle assemblies 500 is coupled to the rear subframe 410.

The front subframe 310 and the rear subframe 410 may be manufactured from high strength steels, high strength aluminum, or another suitable material. According to an exemplary embodiment, the front subframe 310 and the rear subframe 410 feature a tabbed, laser cut, bent, and welded design. In other embodiments, the front subframe 310 and the rear subframe 410 are manufactured from tubular members to form a space frame. The front subframe 310 and the rear subframe 410 may also include forged frame sections, rather than fabricated or cast frame sections, to mitigate the stress, strains, and impact loading imparted during operation of the vehicle 10. Aluminum castings may be used for various cross member components where the loading is compatible with such material properties.

The passenger capsule 200, the front subframe 310, and the rear subframe 410 are integrated into the hull and frame assembly 100 to efficiently carry chassis loading imparted during operation of the vehicle 10, during a lift event, during a blast event, or under still other conditions. During a blast event, conventional frame rails can capture the blast force, transferring the blast force into the vehicle 10 and the occupants thereof. The vehicle 10 replaces conventional frame rails and instead includes the passenger capsule 200, the front module 300, and the rear module 400. According to an exemplary embodiment, the passenger capsule 200, the front module 300, and the rear module 400 vent blast gases (e.g., traveling upward after a tire triggers an IED), thereby reducing the blast force on the passenger capsule 200 and the occupants within passenger capsule 200. Traditional frame rails may also directly impact (e.g., contact, engage, hit, etc.) the floor of traditional military vehicles. The hull and frame assembly 100 does not include traditional frame rails extending along a length of the vehicle 10, thereby eliminating the ability for such frame rails to impact the floor assembly 202 of the passenger capsule 200.

As shown in FIGS. 1-3, the rear module 400 includes a body assembly, shown as cargo body assembly 420, supported by the rear subframe 410. The cargo body assembly 420 includes a deck, shown as bed 430; a pair of wheel wells, shown as wheel wells 440, positioned along opposing lateral sides of the bed 430 and over the wheels of the rear axle assembly of the axle assemblies 500; and a pair of storage compartments, shown as stowage boxes 450, positioned along and on top of the wheel wells 440. As shown in FIG. 3, the bed 430, the wheel wells 440, and the stowage boxes 450 cooperatively define a compartment, shown as bed cavity 460.

Figure 7:
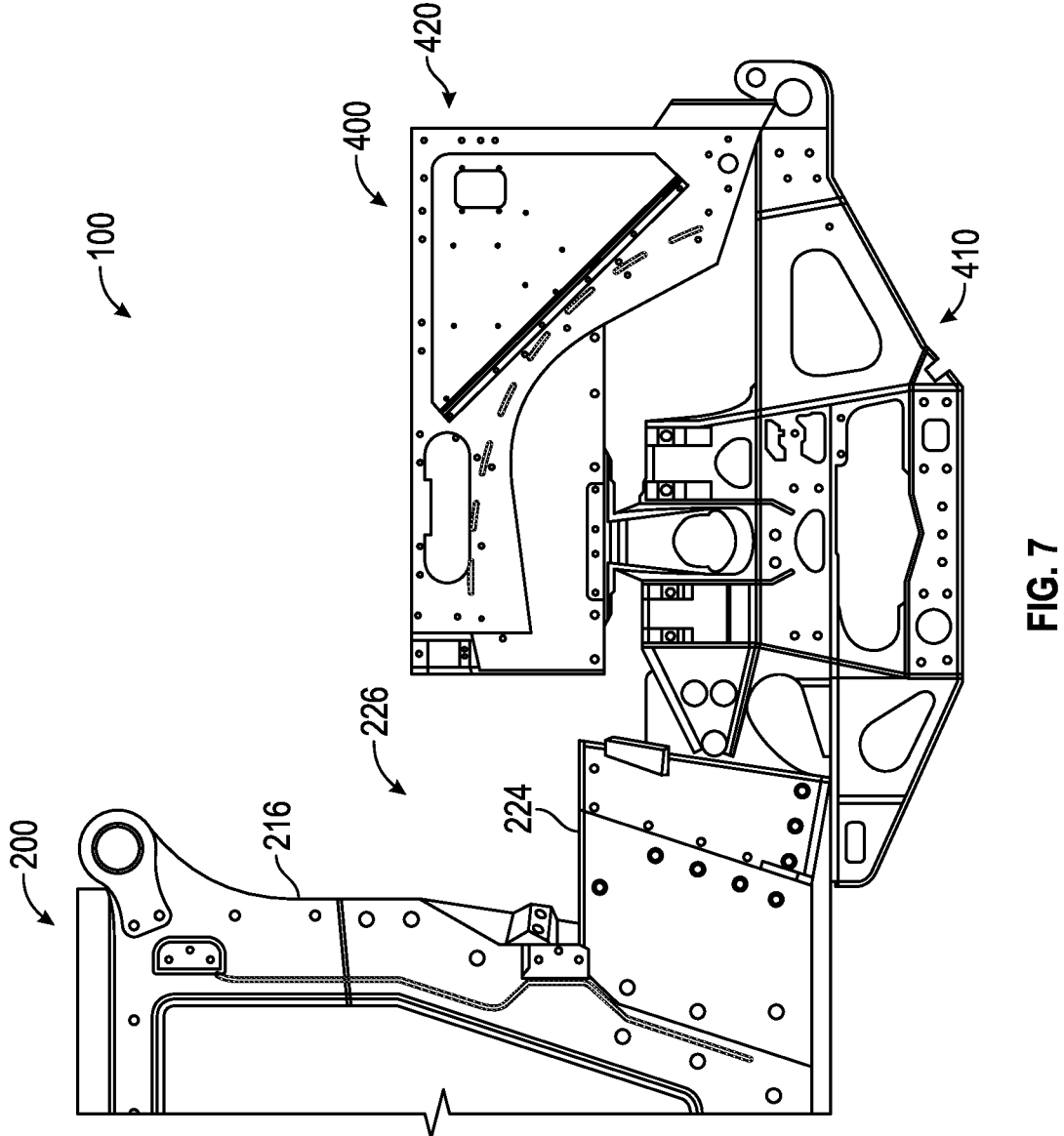
FIG. 7 is a detailed side view of a chassis assembly of the vehicle of FIG. 1, according to another exemplary embodiment.
Figure 8:
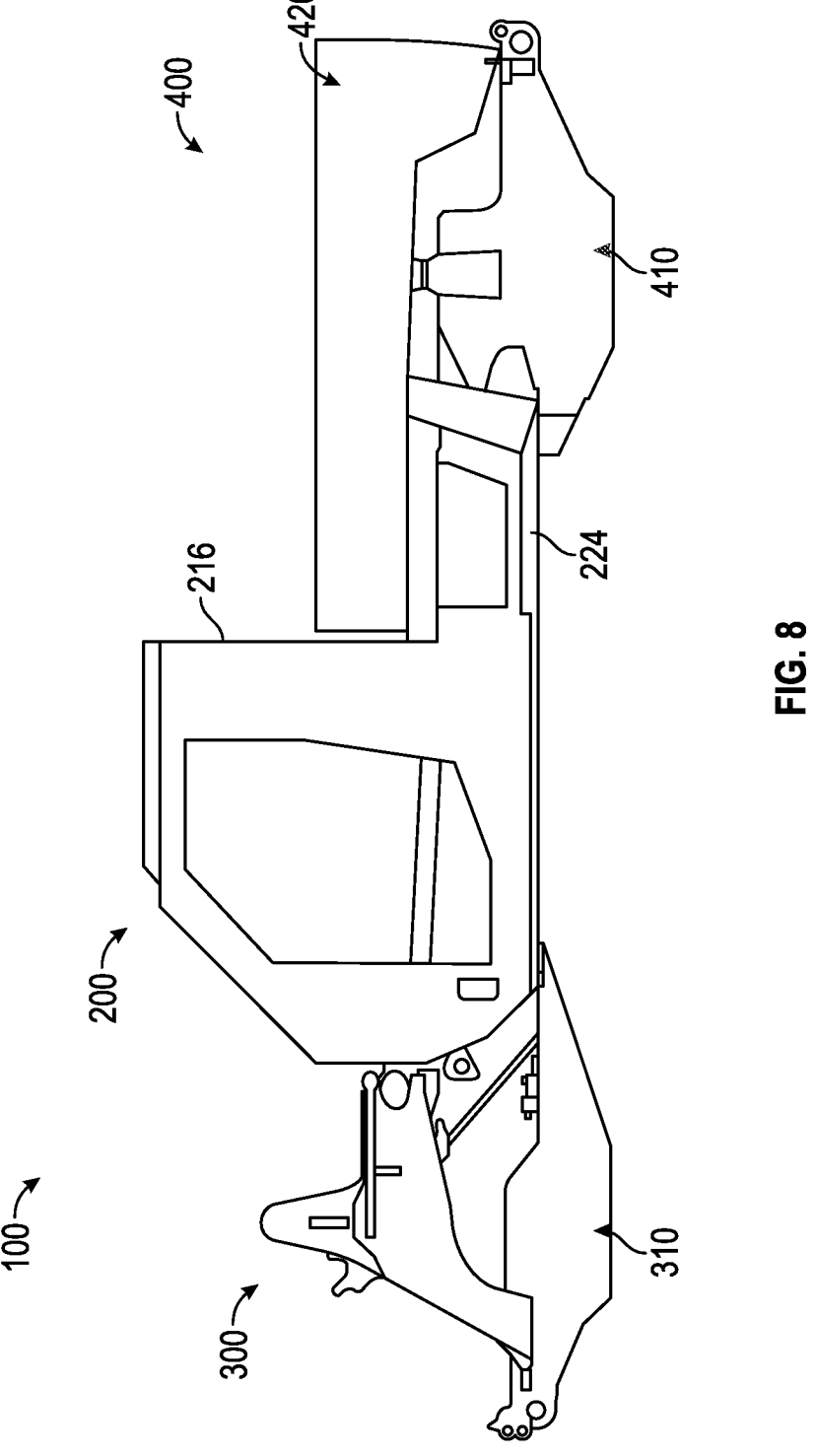
FIG. 8 is a side view of a chassis assembly of the vehicle of FIG. 1, according to another exemplary embodiment.

In some embodiment, as shown in FIG. 7, the passenger capsule 200 includes a protrusion, shown as capsule extension 224, extending from a bottom portion of the rear wall 216 of the passenger capsule 200. According to an exemplary embodiment, the capsule extension 224 provides an extended wheelbase for the vehicle 10, which facilitates providing a cavity, shown as gap 226, between the rear wall 216 and the cargo body assembly 420 of the rear module 400. In some embodiments, as shown in FIG. 8, the capsule extension 224 replaces a rear portion (e.g., back seats, etc.) of the passenger capsule 200 and supports an extended cargo body assembly 420 (e.g., eliminating the gap 226 of FIG. 7 or maintaining the gap 226 of FIG. 7).

Figure 9:
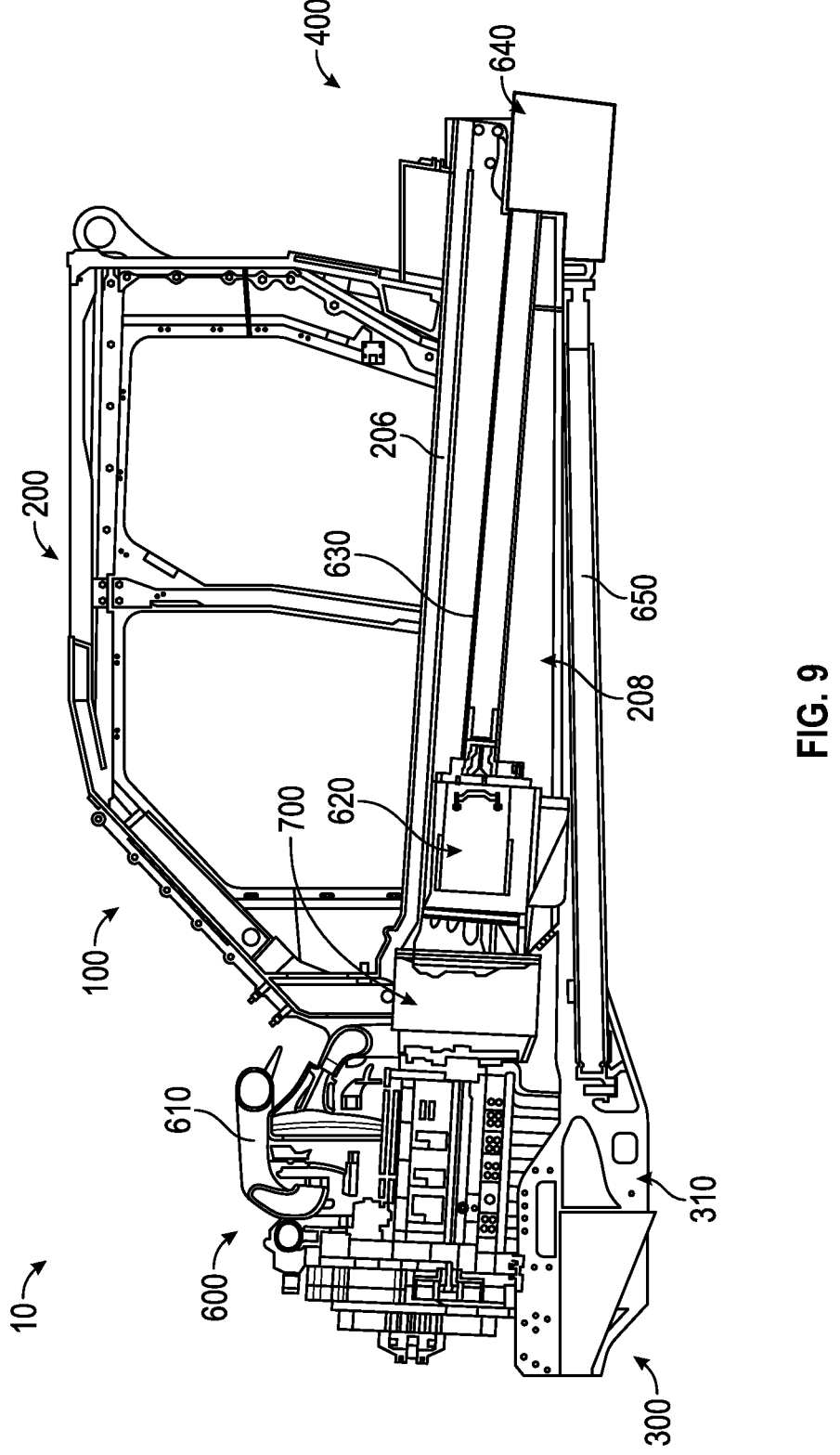
FIG. 9 is a cross-sectional side view of the vehicle of FIG. 1 including a driveline, according to an exemplary embodiment.

As shown in FIG. 9, the driveline 600 includes a first driver (e.g., an internal combustion engine), shown as engine 610; a transmission device, shown as transmission 620; a first drive shaft, shown transaxle drive shaft 630, coupled to the transmission 620; a power splitter, shown as transaxle 640, coupled to the transaxle drive shaft 630 and the rear axle assembly 500; a second drive shaft, shown as front axle drive shaft 650, extending between the transaxle 640 and the front axle assembly 500 (e.g., a front differential thereof); and a second driver (e.g., an electric motor/generator, an electromagnetic device, etc.), shown as electric motor 700, positioned between the engine 610 and the transmission 620.

As shown in FIG. 9, the engine 610 is positioned within the front module 300 and supported by the front subframe 310. As shown in FIG. 9, the electric motor 700 and the transmission 620 are positioned beneath the passenger capsule 200 within the tunnel slot 208 of the structural tunnel 206. The transaxle drive shaft 630 extends from the transmission 620 longitudinally along the structural tunnel 206 and within tunnel slot 208 to the transaxle 640. According to an exemplary embodiment, the transaxle 640 is positioned within the rear module 400 and supported by the rear subframe 410. As shown in FIG. 9, the front axle drive shaft 650 is positioned beneath the transaxle drive shaft 630 and outside of the tunnel slot 208 (e.g., between the transaxle drive shaft 630 and the v-shaped belly deflector 220).

According to various embodiments, the engine 610 is individually, the electric motor 700 is individually, or both the engine 610 and the electric motor 700 are cooperatively configured to provide power to the transmission 620 to drive the transmission 620 and, thereby, drive the transaxle drive shaft 630, the transaxle 640, the rear axle assembly 500, the front axle drive shaft 650, and the front axle assembly 500 to drive the vehicle 10.

In some embodiments, the engine 610 is an internal combustion engine (e.g., a diesel engine, a gasoline engine, etc.) powered by a combustible fuel. In embodiments, the electric motor 700 is an electric motor (e.g., an AC electric motor, a DC electric motor, etc.) powered by electrical energy (e.g., from a battery, from a capacitor, from a fuel cell, etc.). In other embodiments, the engine 610 and/or the electric motor 700 is a different type of driver (e.g., an internal combustion engine, an electric motor, etc.). In other embodiments, one of the engine 610 or the electric motor 700 is omitted.

Hood Configuration

As shown in FIGS. 1 and 2, the front module 300 includes a body panel, shown as hood 320, supported by the front subframe 310. The hood 320 partially surrounds components of the driveline 600 (e.g., an engine, radiators, etc.) of the vehicle 10. The hood 320 may be manufactured from a composite material (e.g., carbon fiber, fiberglass, a combination of fiberglass and carbon fiber, etc.) or a metal material (e.g., steel, aluminum, etc.). The hood 320 may be configured (e.g., shaped, etc.) to maximize vision while clearing under-hood components. In some embodiments, the hood 320 is used in a configuration of the vehicle 10 without a supplemental armor kit (e.g., an "A-Kit" configuration or lightweight configuration).

FIGS. 10-14 illustrate the vehicle 10 in an up-armored, supplementally-armored, enhanced protection, or "B-Kit" configuration. In the B-Kit configuration, the vehicle 10 is outfitted with a hood or cover assembly, shown as hood assembly 800. The hood assembly 800 may replace the hood 320. In some embodiments, the hood 320 and the hood assembly 800 (e.g., one or more components thereof) are each removably coupled to the vehicle 10 (e.g., to the front subframe 310), such that the vehicle 10 may be reconfigured between the A-Kit configuration and the B-Kit configuration as desired.

The hood assembly 800 has an interior volume, internal volume, or engine compartment, shown as hood volume 802, that receives a portion of the driveline 600. The hood assembly 800 may be configured to protect the driveline 600 (e.g., from explosives, from projectiles, such as bullets, from debris, etc.). In some embodiments, the hood assembly 800 is provides a greater damage resistance (e.g., a greater resistance to explosives, a greater resistance to projectiles, a greater level of protection, etc.) than the than the hood 320. The hood assembly 800 may be made from a metal (e.g., steel, iron, etc.) or another impact resistant material. In some embodiments, the hood assembly 800 includes or acts as armor plating.

The hood assembly 800 includes a first portion (e.g., a cover portion, a top portion, etc.), shown as hood 810, and a second portion (e.g., a ventilation portion, a front portion, etc.), shown as grille 850. The hood 810 and the grille 850 are each coupled to the front subframe 310. In some embodiments, the hood 810 and the grille 850 are separate components (e.g., that are movable relative to one another). In other embodiments, the hood 810 and the grille 850 are coupled to one another (e.g., as a subassembly, as a weldment, integrally formed as a single, continuous piece, etc.). In such embodiments, the hood 810 and the grille 850 may move relative to one another.

The hood 810 extends long a top side, a left side, a right side, and a front side of the vehicle 10. The hood 810 defines a first recess or portion, shown as grille recess 812, that receives the grille 850. In embodiments where the hood 810 moves relative to the grille 850, the grille recess 812 may provide clearance between the grille 850 and the hood 810 during such movement. In embodiments where the hood 810 and the grille 850 do not move relative to one another, the grille recess 812 may be omitted.

The hood 810 further defines a pair of wheel-receiving portions, shown as wheel wells 814. The wheel wells 814 are positioned on the right side and the left side of the vehicle 10, respectively. Each of the wheel wells 814 receives a tractive element (e.g., a wheel) of the front axle assembly 500, covering the tractive element. The wheel wells 814 are sized to provide clearance that permits rotation of the wheels when driving the vehicle and when turning.

The front subframe 310 includes a pair of lift hoops or interfaces, shown as lift points 816. Each of the lift points 816 defines an aperture that may receive a hook, chain, rope, or cable, to facilitate lifting of the vehicle 10 (e.g., during transport or maintenance). The hood 810 defines a pair of apertures, shown as lift point apertures 818, positioned along a top surface of the hood 810. The lift point apertures 818 each receive one of the lift points 816 therethrough. The lift point apertures 818 facilitate accessing the lift points 816 with the hood 810 in a closed position.

The vehicle 10 includes an air intake, conduit, or snorkel, shown as intake 820. The intake 820 may be configured to supply air to the driveline 600 (e.g., to facilitate combustion of fuel). The intake 820 extends vertically upward along a rear, left side of the hood assembly 800. The hood 810 includes a notch or cutout, shown as intake cutout 822. The intake cutout 820 may facilitate movement of the hood 810 relative to the intake 820.

The grille 850 is positioned along a front side of the vehicle 10. The grille 850 may be configured to facilitate airflow longitudinally into the hood volume 802 (e.g., to facilitate cooling). As shown, the grille 850 includes a series of laterally-extending members or slats, shown as louvers 852. The louvers 852 are vertically offset from one another to define passages for air to enter the hood volume 802.

Hood Actuation

In some embodiments, the hood 810 is repositionable between a closed, lowered, or secured position, shown in FIGS. 10-14, and an open, raised, or access position, shown in FIGS. 15-19. In the closed position, the hood 810 is lowered to cover the components of the driveline 600 within the hood compartment 802. In the open position, the hood 810 is raised to facilitate access to the components of the driveline 600 within the hood compartment 802. In some embodiments, the hood 810 is selectively repositionable between the open position and the closed position by a user (e.g., without the use of tools or an external lifting device, such as a crane, hoist, or chainfall).

Referring to FIGS. 10-19, the hood 810 is pivotally coupled to the front subframe 310 by a pair of hinge or pivot assemblies, shown as hinge assemblies 1000. Specifically, the hood 810 is configured to pivot relative to the front subframe 310 about a laterally-extending axis, shown as axis of rotation 1002. The axis of rotation 1002 is defined by the hinge assemblies 1000 and extends laterally (e.g., perpendicular to a direction of travel of the vehicle 10). Accordingly, to reposition the hood 810 between the closed position and the open position, the hood 810 is lifted or lowered, causing the hood 810 to pivot about the axis of rotation 1002.

The vehicle 10 includes two hinge assemblies 1000 that are laterally offset from one another along the axis of rotation 1002 (e.g., a left hinge assembly near the left side of the vehicle 10 and a right hinge assembly near the right side of the vehicle 10). Any description of the right hinge assembly 1000 may apply to the left hinge assembly 1000, although the right and left hinge assemblies may be mirrored about a center plane of the vehicle 10 that extends longitudinally and vertically (e.g., perpendicular to the axis of rotation 1002).

Figure 10:
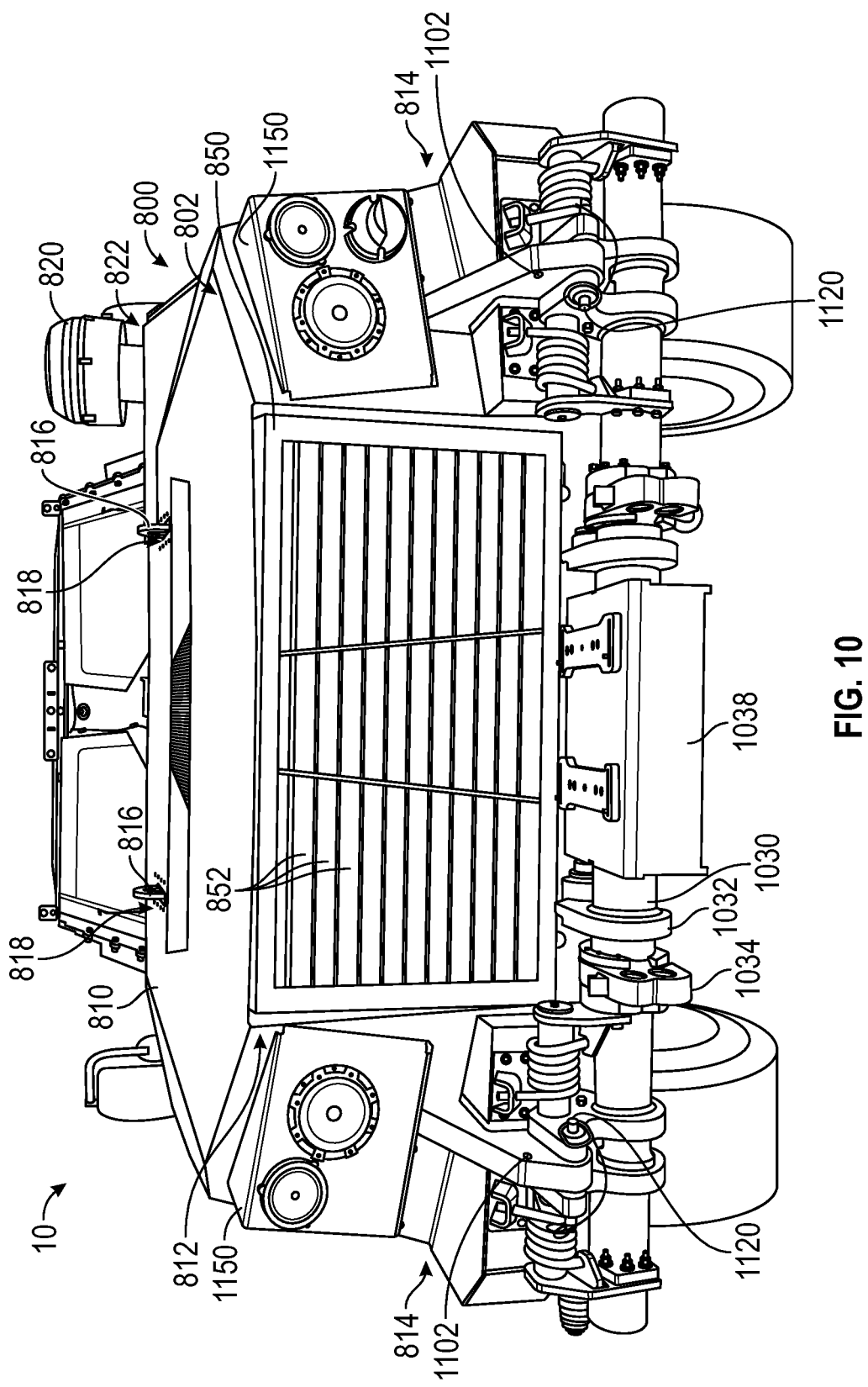
FIGS. 10, 11, 12, 13, and 14 are various views of the vehicle of FIG. 1 in a B-Kit configuration including a hood assembly, where a hood of the hood assembly is in a closed position, according to another exemplary embodiment.
Figure 11:
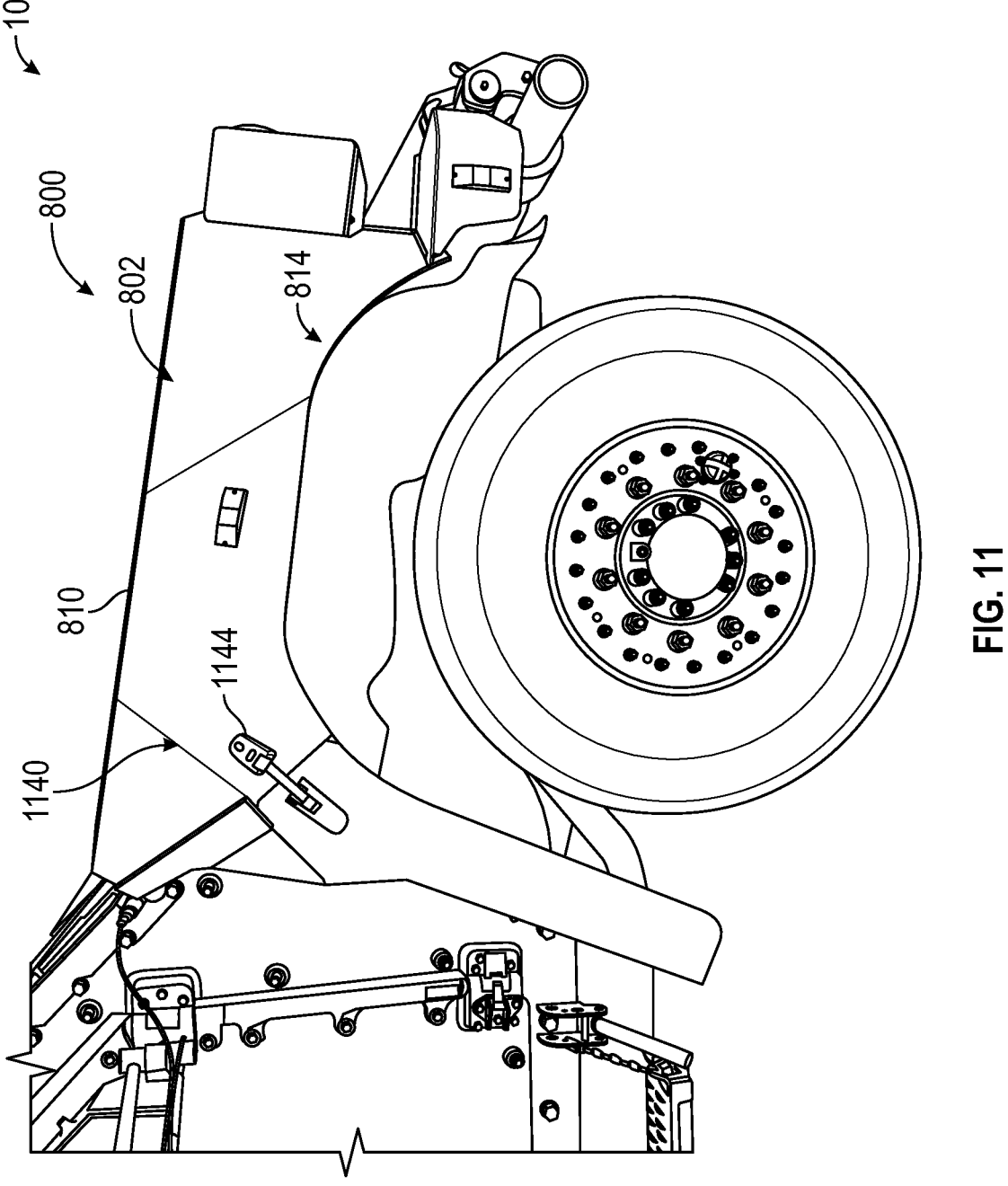
Figure 12:
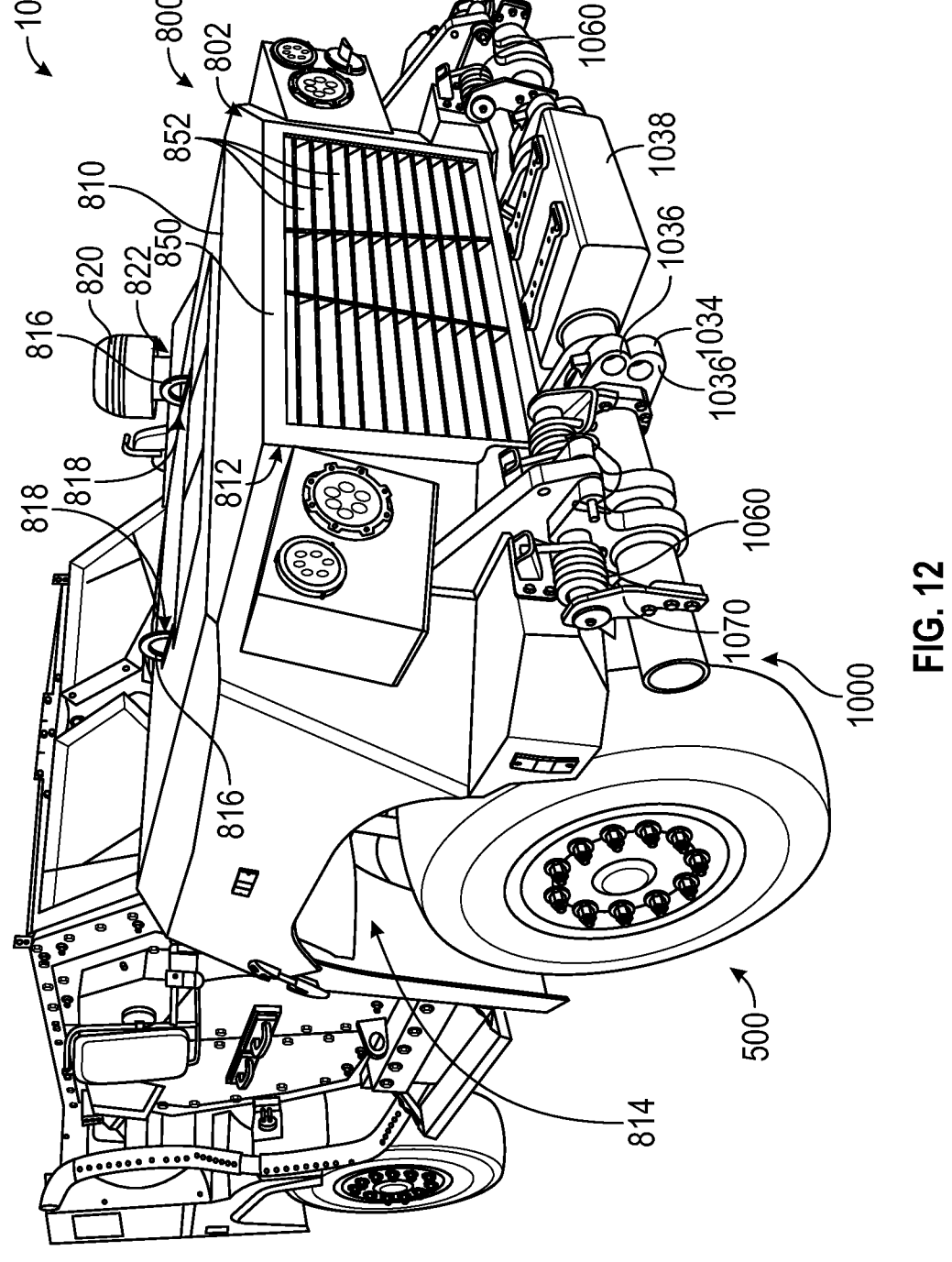
Figure 13:
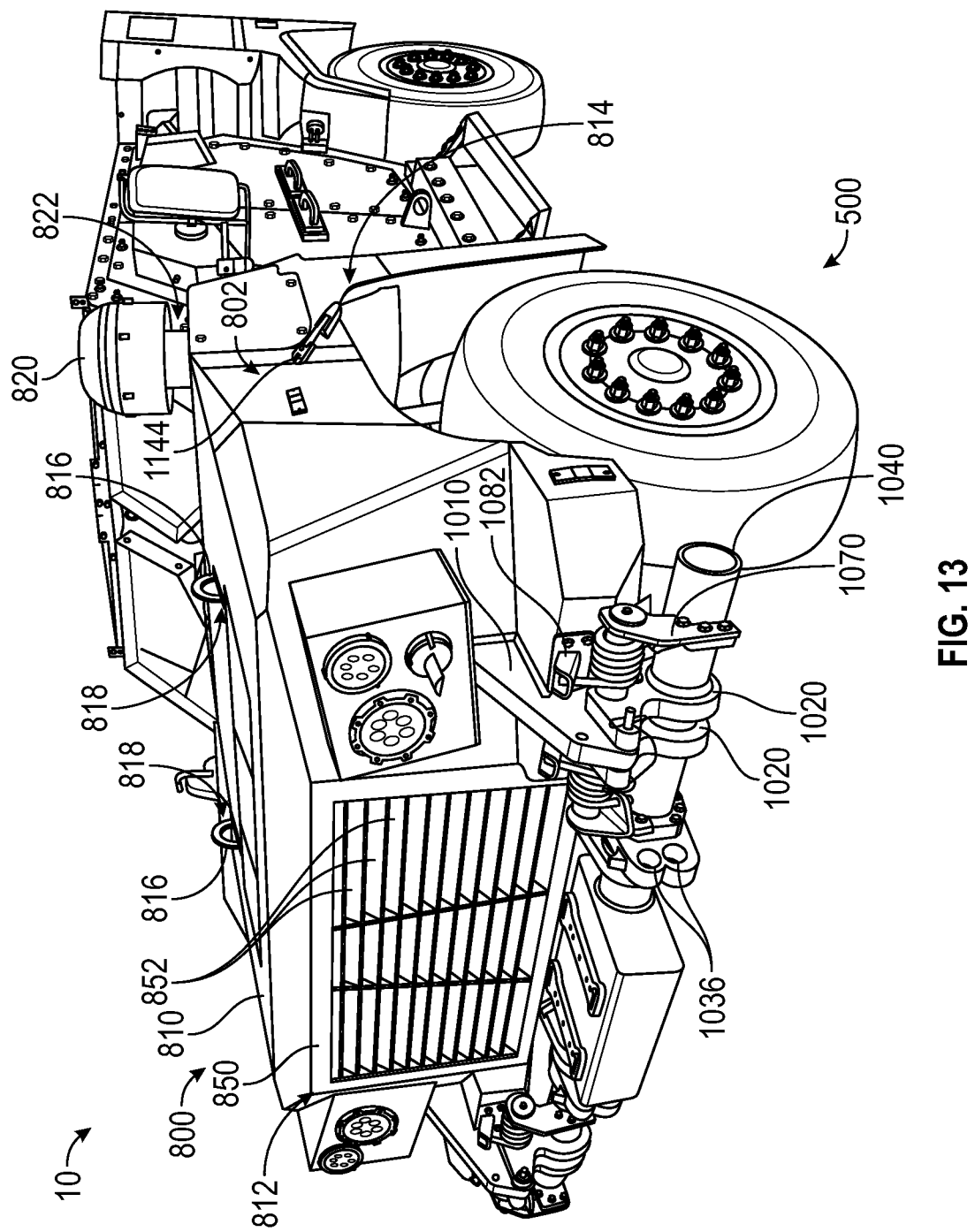
Figure 14:
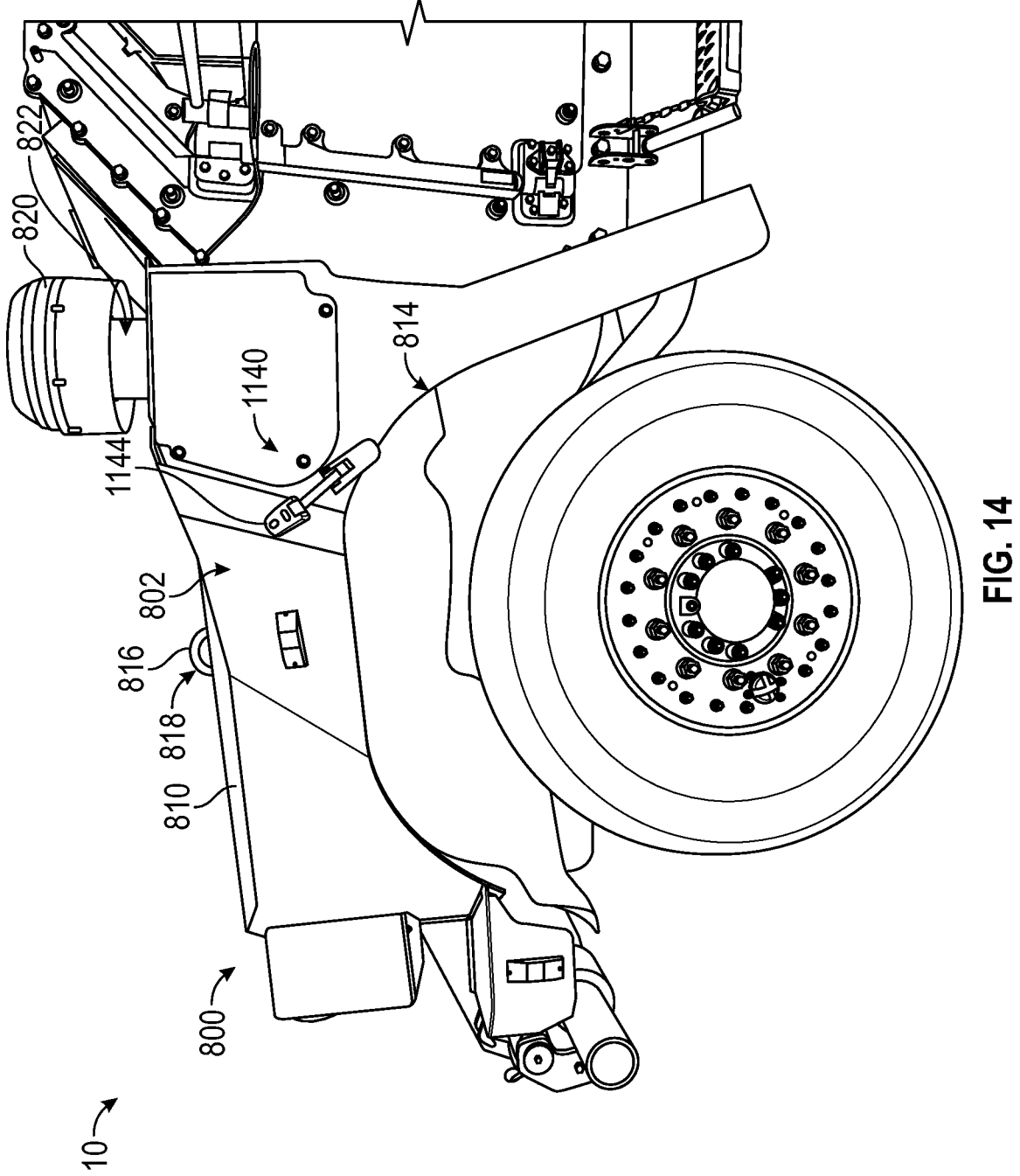
Figure 20:
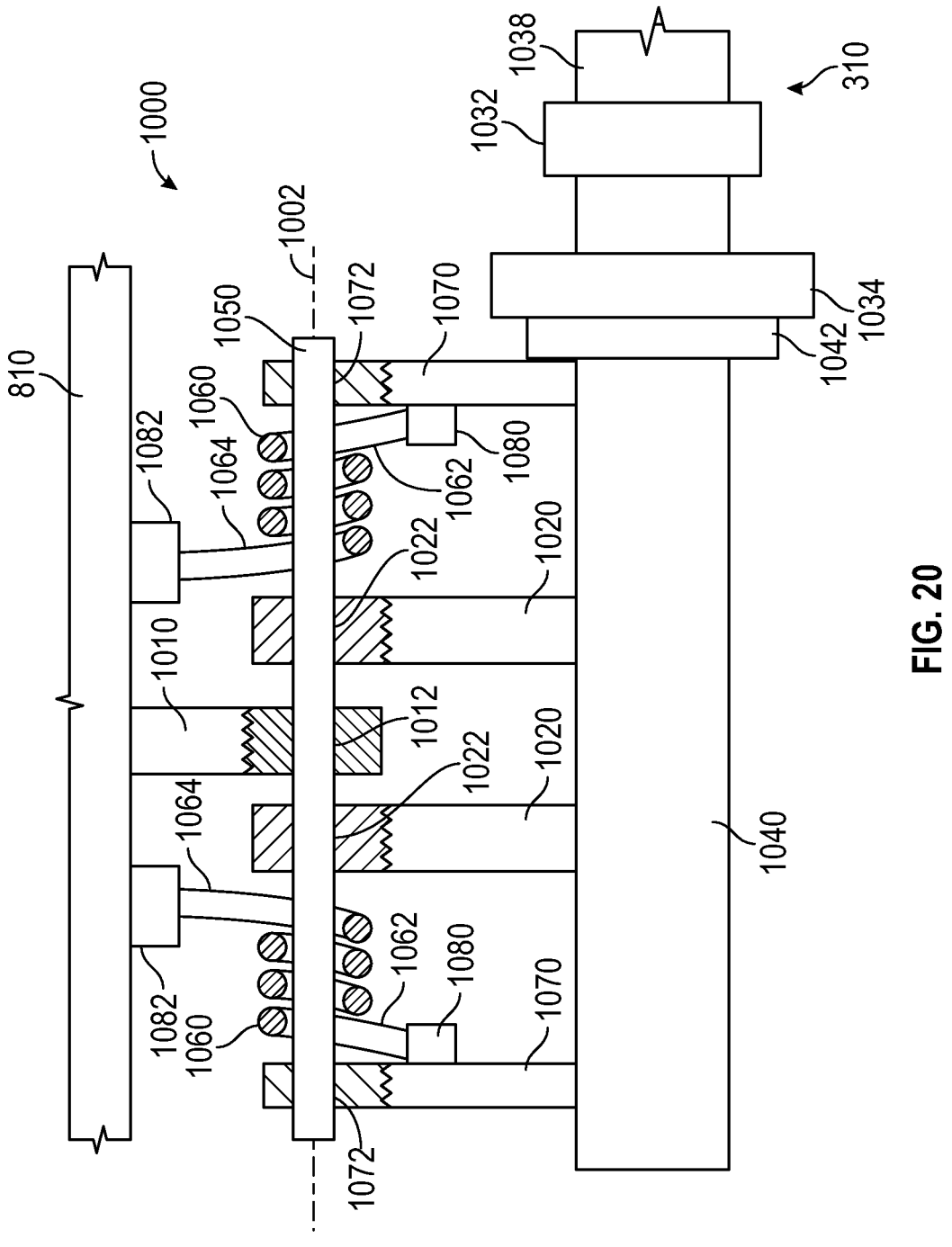
FIG. 20 is a partial section view of a hinge assembly of the hood assembly of FIG. 10.

Referring to FIGS. 10, 12, and 20, the right hinge assembly 1000 is shown and described according to an exemplary embodiment. The hinge assembly 1000 includes a first protrusion, plate, knuckle, or support, shown as center plate 1010. The center plate 1010 is fixedly coupled to the hood 810. In some embodiments, the center plate 1010 and the hood 810 are formed as a single, continuous piece (e.g., a weldment). The center plate 1010 defines an aperture, shown as hinge pin aperture 1012, that is centered about the axis of rotation 1002. The hinge pin aperture 1012 extends laterally through the center plate 1010 (e.g., is a through hole).

The hinge assembly 1000 further includes a pair of second protrusions, plates, knuckles, or supports, shown as side plates 1020. The side plates 1020 are coupled to the front subframe 310. The side plates 1020 each define an aperture, shown as hinge pin aperture 1022, that is centered about the axis of rotation 1002. The hinge pin apertures 1022 each extend laterally through the corresponding side plate 1020 (e.g., is a through hole). In other embodiments, the side plates 1020 are coupled to the hood 810, and the center plate 810 is coupled to the front subframe 310.

Referring to FIGS. 10 and 12, the front subframe 310 includes a laterally-extending member or tubular member, shown as frame member 1030. As shown in FIG. 10, the frame member 1030 is a round tubular member that extends laterally along the front of the vehicle 10. The frame member 1030 is fixedly coupled to the rest of the front subframe 310 by a pair of plates, shown as support plates 1032. By way of example, each of the support plates 1032 may define an aperture that the frame member 1030 extends through, and the support plates 1032 may be welded to the frame member 1030.

Each end of the frame member 1030 is fixedly coupled to (e.g., welded to) a towing plate or interface plate, shown as tow plate 1034. Accordingly, the tow plates 1034 are positioned laterally outward from the support plates 1032. The tow plates 1034 extend substantially perpendicular to the frame member 1030. Each tow plate 1034 defines a pair of lateral apertures, passages, through holes, two interfaces, or tow eyes, shown as tow apertures 1036. The tow apertures 1036 are each configured to receive an interface member (e.g., a hook, a chain, a rope, a cable, etc.) to facilitate towing the vehicle 10 and/or towing with the vehicle 10.

In some embodiments, an interface, shown as winch box 1038, is fixedly coupled to the frame member 1030. The winch box 1038 is positioned (e.g., centered) between the support plates 1032. The winch box 1038 defines a substantially horizontal surface that is configured to support an accessory, such as a winch. In other embodiments, the winch box 1038 is omitted.

Referring to FIGS. 10, 12, and 20, the right hinge 1000 includes a laterally-extending member, tubular member, removable frame, or removable subframe, shown as frame member 1040. As shown in FIG. 10, the frame member 1040 is a round tubular member that extends laterally along the front of the vehicle 10. The frame member 1030 is fixedly coupled to an end portion of each side plate 1020 opposite the hinge pin aperture 1022. By way of example, each of the side plates 1020 may define an aperture that the frame member 1430 extends through, and the side plates 1020 may be welded to the frame member 1040.

The right hinge assembly 1000 further includes a coupler, shown as flange 1042. The flange 1042 is fixedly coupled (e.g., welded) to an end of the frame member 1040. The flange 1042 extends radially outward from the frame member 1040. The flange 1042 is removably coupled to one of the tow plates 1034. By way of example, the flange 1042 may define a series of apertures, through which fasteners extend to couple the flange 1042 to the tow plate 1034 (e.g., the fasteners may engage tapped holes defined in the tow plate 1034). Accordingly, the flange 1042 removably couples the frame member 1040 and the side plates 1020 to the front subframe 310.

The right hinge assembly 1000 further includes an axle, pin, or pivot, shown as hinge pin 1050. The hinge pin 1050 is an elongate, cylindrical member and is centered about the axis of rotation 1002. The hinge pin 1050 extends through the hinge pin aperture 1012 and the hinge pin apertures 1022, pivotally coupling the center plate 1010 to the side plates 1020. By way of example, the center plate 1010 and/or the side plates 1020 may rotate about the hinge pin 1050. Accordingly, the hinge pin 1050, the center plate 1010, and the side plates 1020 cooperate to pivotally couple the hood 810 to the front subframe 310.

Referring still to FIGS. 10, 12, and 20, the right hinge assembly 1000 further includes a pair of biasing elements, shown as torsion springs 1060. The torsion springs 1060 are substantially centered about the hinge pin 1050 and receive the hinge pin 1050 therethrough. The torsion springs 1060 are configured to apply a biasing torque (e.g., a biasing force) to lift the hood 810 (i.e., to move the hood 810 toward the open position). The torsion springs 1060 may facilitate one or more operators lifting the hood 810 with a reduced effort (e.g., with a reduced force requirement) relative to a configuration that omits the torsion springs 1060. Each torsion spring 1060 includes a first end or interface, shown as leg 1062, and a second end or interface, shown as leg 1064.

The right hinge assembly 1000 includes a pair of support plates, shown as spring support plates 1070. Each spring support plate 1070 is fixedly coupled (e.g., welded) to the frame member 1040. The spring support plates 1070 are laterally offset from one another such that the side plates 1020 are positioned between the spring support plates 1070. Each torsion spring 1060 is positioned between a spring support plate 1070 and the nearest (e.g., adjacent) side plate 1020. The spring support plates 1070 may support the ends of the hinge pin 1050, preventing a scenario where the torsion springs 1060 impart a cantilevered load on the hinge pin 1050.

The spring support plates 1070 each define an aperture, shown as hinge pin aperture 1072. Each hinge pin aperture 1072 extends laterally within (e.g., through) the spring support plate 1070 and is centered about the axis of rotation 1002. The hinge pin apertures 1072 each receive an end portion of the hinge pin 1050. Accordingly, the spring supports 1070 support the ends of the hinge pin 1050.

A first protrusion, interface, or stop, shown as torsion spring stop 1080, is fixedly coupled to (e.g., welded to) each of the spring support plates 1070. The torsion spring stop 1080 extends laterally outward from the corresponding spring support 1070. The torsion spring stop 1080 engages the leg 1062, limiting (e.g., preventing) movement of the leg 1062 relative to the spring support plates 1070. Accordingly, the torsion spring stop 1080 limits movement of the leg 1062 relative to the front subframe 310.

A pair of second protrusions, interfaces, or stops, shown as stop brackets 1082, are fixedly coupled to (e.g., welded to) the hood 810. Each stop bracket 1082 defines an aperture that receives the leg 1064 of the corresponding torsion spring 1060. The stop brackets 1082 engage the legs 1064, limiting (e.g., preventing) movement of the legs 1064 relative to the hood 810. Accordingly, the biasing forces of the torsion springs 1060 are imparted on the hood 810 and the front subframe 310 through the stop brackets 1082 and the torsion spring stop 1080, respectively.

Figures 21, 22:
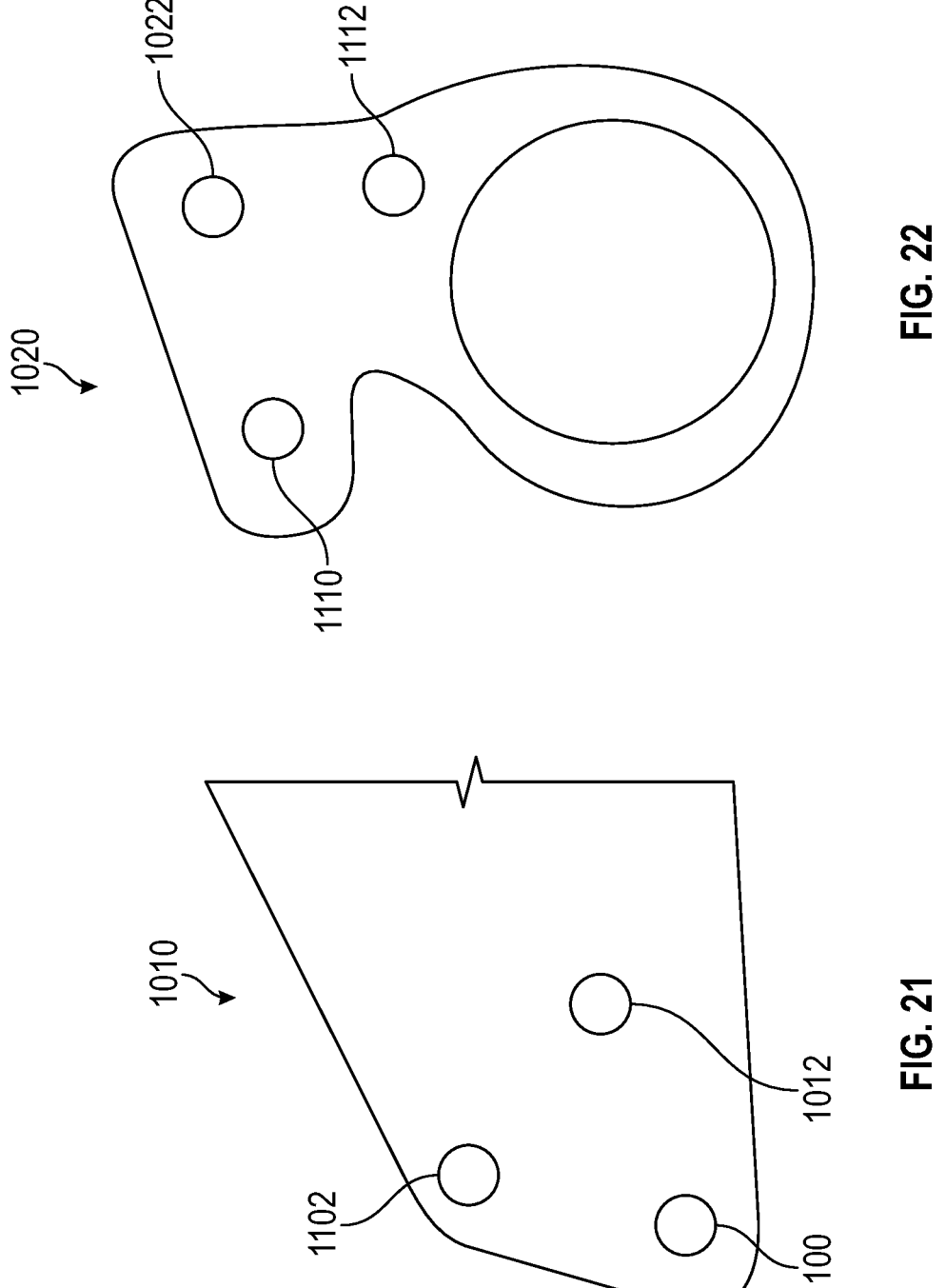
FIG. 21 is a side view of a center plate of the hinge assembly of FIG. 20.
FIG. 22 is a side view of a side plate of the hinge assembly of FIG. 20.

Referring to FIG. 21, the center plate 1010 is shown according to an exemplary embodiment. The center plate 1010 defines a first aperture, passage, or through hole, shown as closed pin aperture 1100, and a second aperture, passage, or through hole, shown as open pin aperture 1102. The closed pin aperture 1100 and the open pin aperture 1102 extend laterally through the center plate 1010 (e.g., through the entirety of the center plate 1010. The closed pin aperture 1100 corresponds to the closed position of the hood 810 (e.g., is utilized when the hood 810 is in the closed position). The open pin aperture 1102 corresponds to the open position of the hood 810 (e.g., is utilized when the hood 810 is in the open position). In some embodiments, the closed pin aperture 1100 and the open pin aperture 1102 are equidistant from the axis of rotation 1002.

Referring to FIG. 22, each side plate 1020 defines a first aperture, passage, or through hole, shown as pin aperture 1110, and a second aperture, passage, or through hole, shown as stop aperture 1112. The pin aperture 1110 and the stop aperture 1112 extend laterally through the side plate 1020 (e.g., through the entirety of the side plate 1020).

Figure 15:
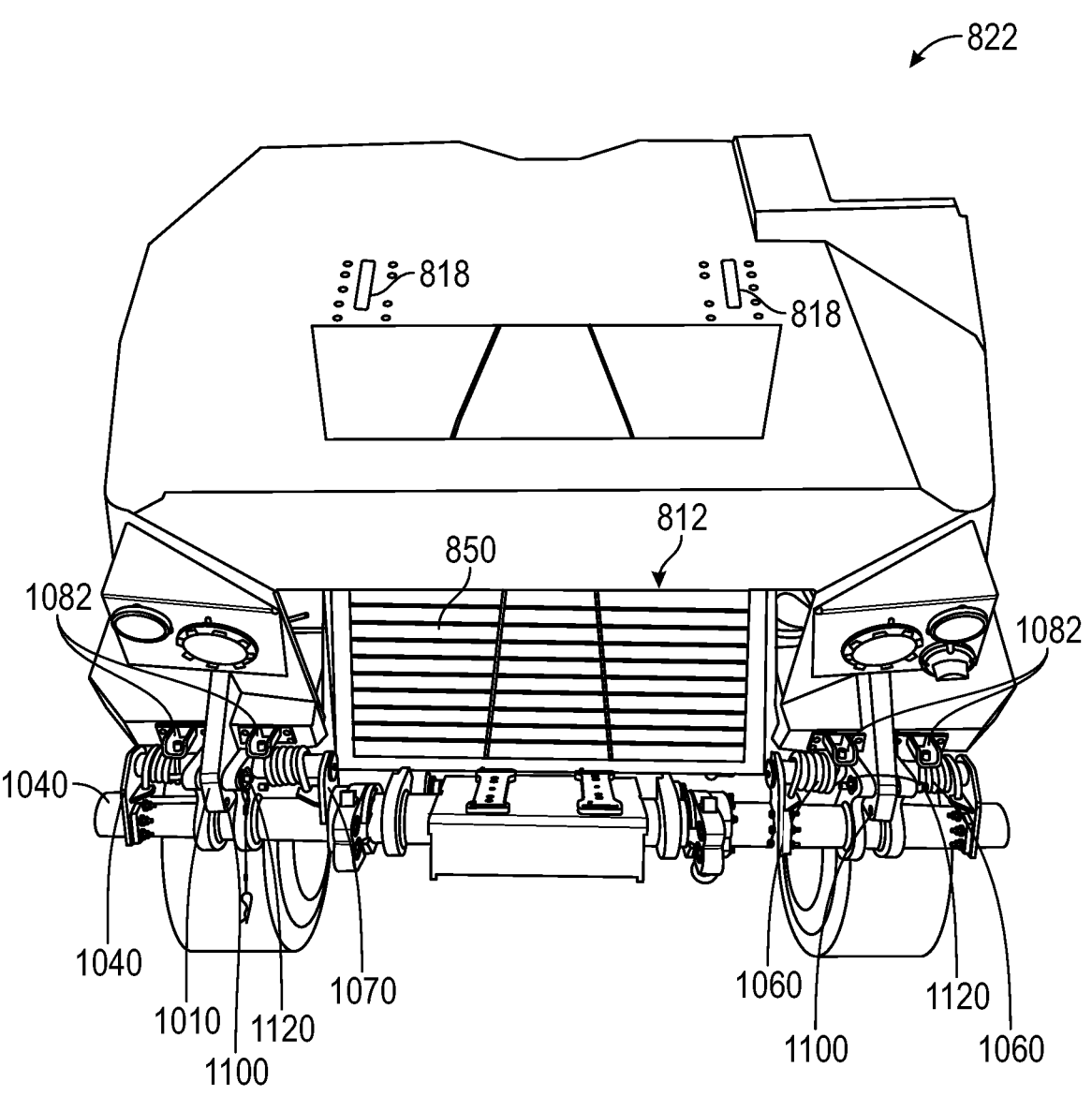
FIGS. 15, 16, 17, 18, and 19 are various views of the vehicle of FIG. 1 in the B-Kit configuration of FIG. 10, where the hood is in an open position.
Figure 16:
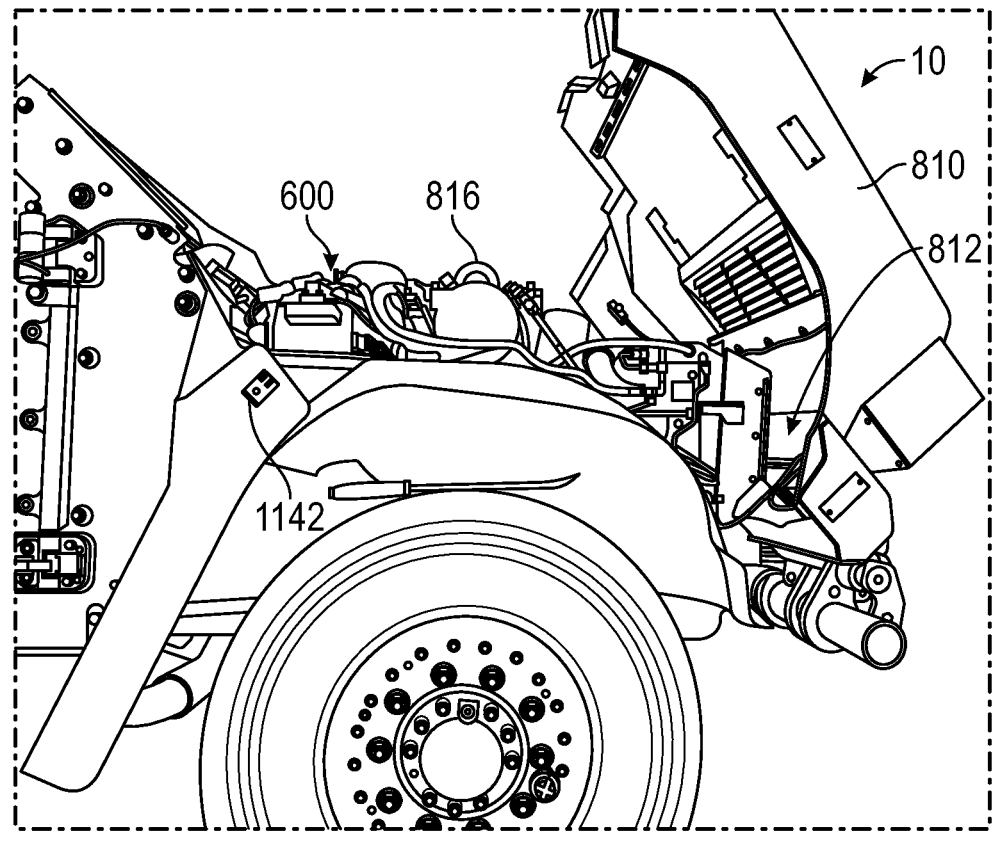
Figure 17:
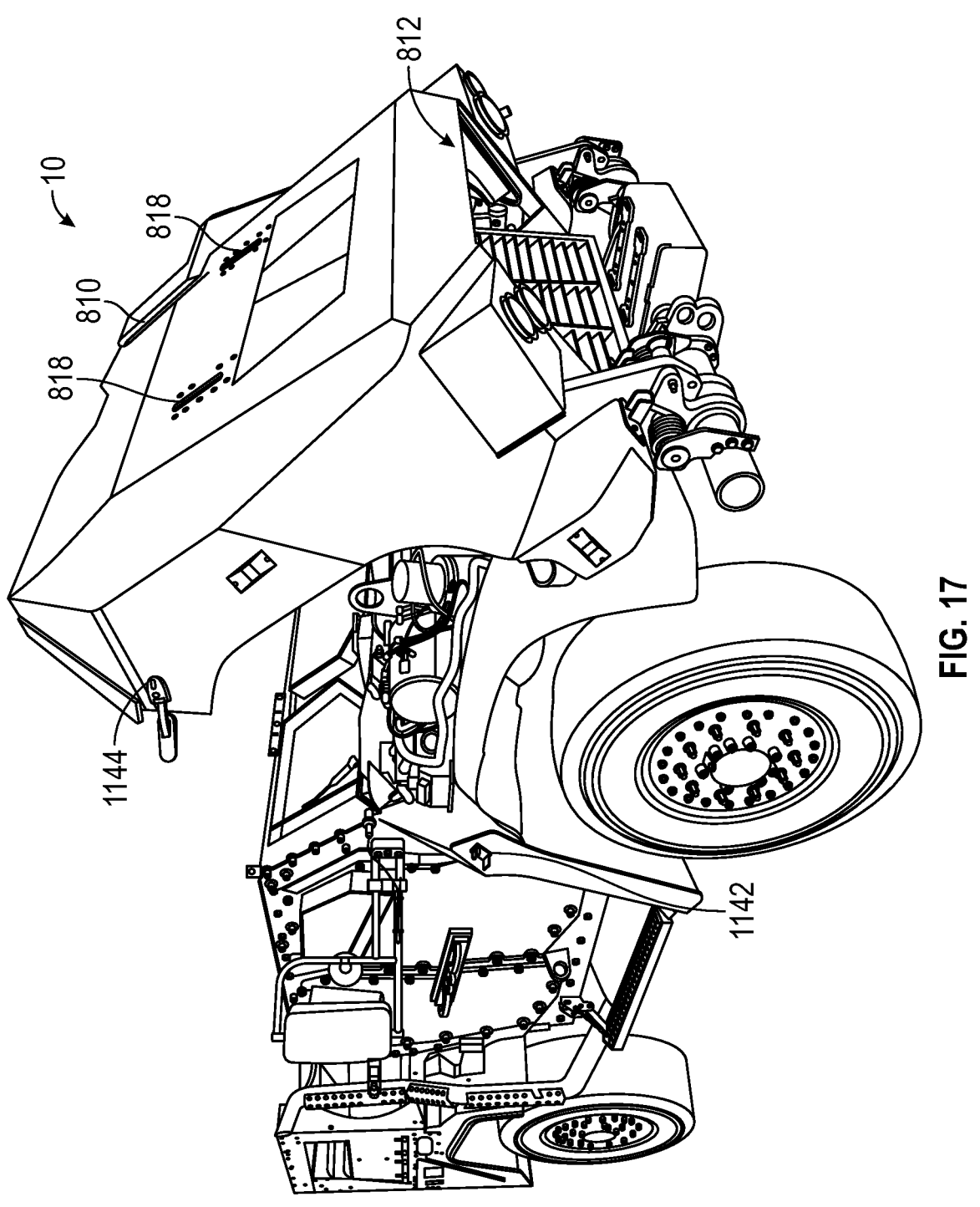
Figure 18:
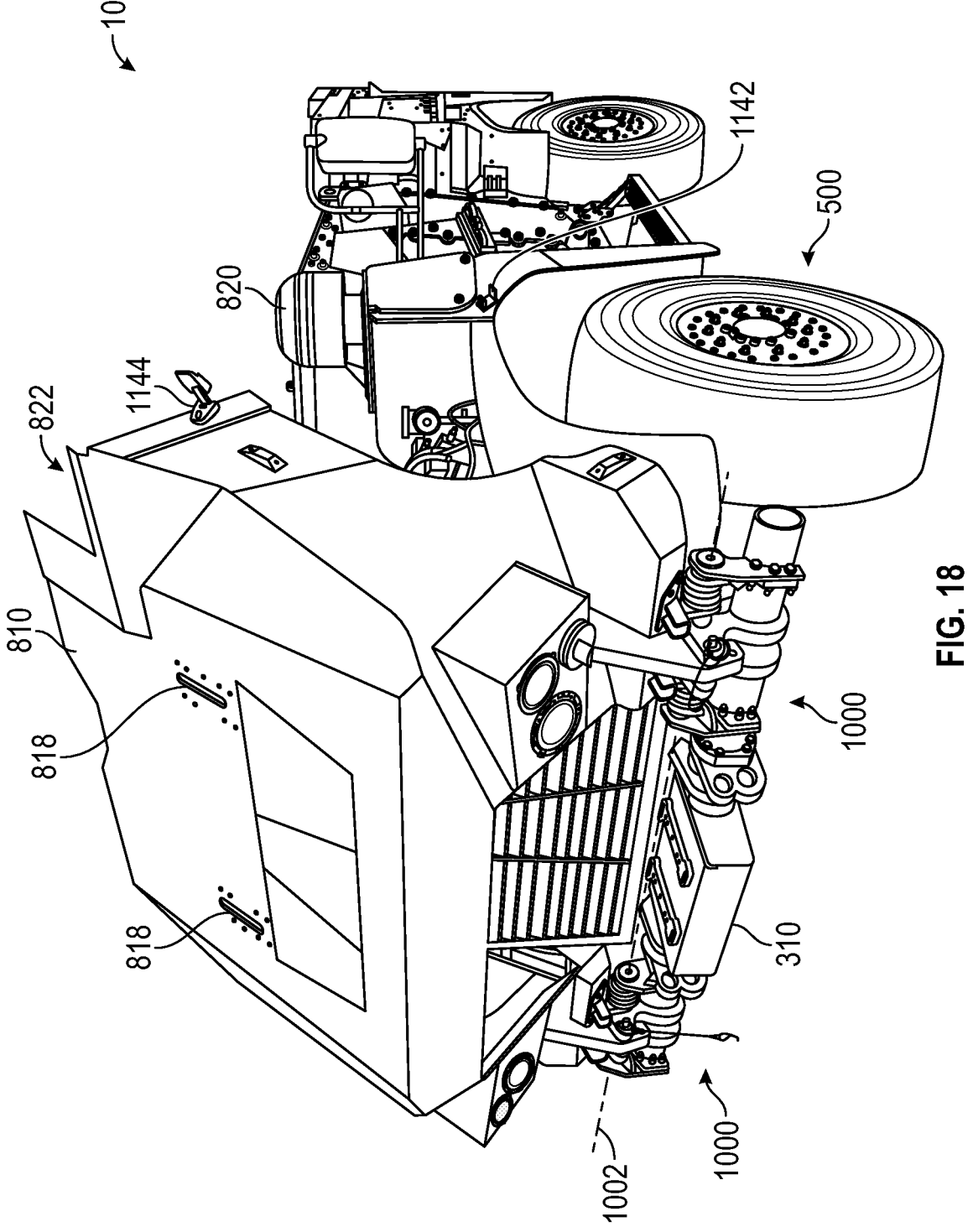
Figure 19:
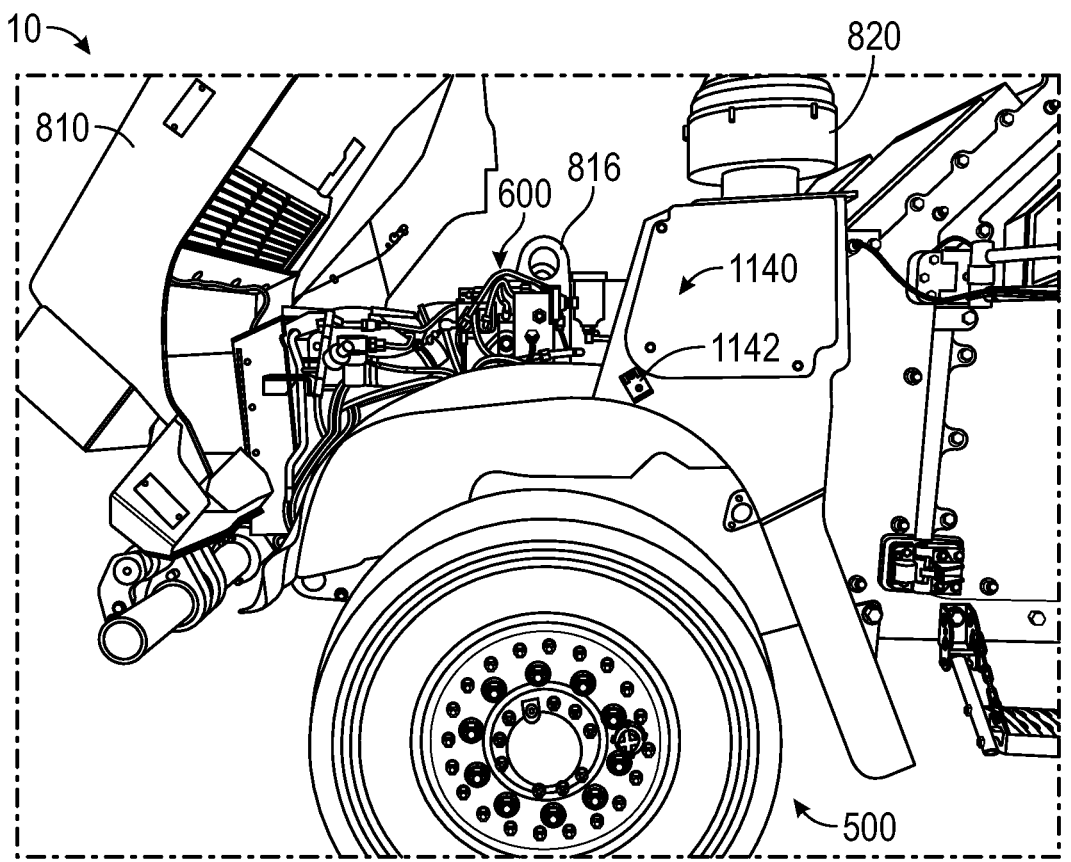

Referring to FIGS. 10, 15, 21, and 22, the closed pin aperture 1100, the open pin aperture 1102, and the pin apertures 1110 selectively receive a pin, shear member, or fastener, shown as locking pin 1120. The locking pin 1120 selectively holds the hood 810 in the closed position or the open position. By way of example, when the hood 810 is in the closed position (e.g., as shown in FIG. 10), the pin apertures 1110 align with the closed pin aperture 1100. The locking pin 1120 is inserted through the closed pin aperture 1100 and the pin apertures 1110, limiting (e.g., preventing) movement of the hood 810 relative to the front subframe 310 away from the closed position. By way of another example, when the hood 810 is in the open position (e.g., as shown in FIG. 15), the pin apertures 1110 align with the open pin aperture 1102. The locking pin 1120 is inserted through the open pin aperture 1102 and the pin apertures 1110, limiting (e.g., preventing) movement of the hood 810 relative to the front subframe 310 away from the open position. To reconfigure the hood 810 between the open and closed position, the locking pin 1120 may be removed and reinserted through the apertures. In some embodiments, the locking pin 1120 includes a retaining mechanism or retainer (e.g., a cotter pin), that selectively prevents removal (e.g., accidental removal) of the locking pin 1120 from the apertures.

Figure 27:
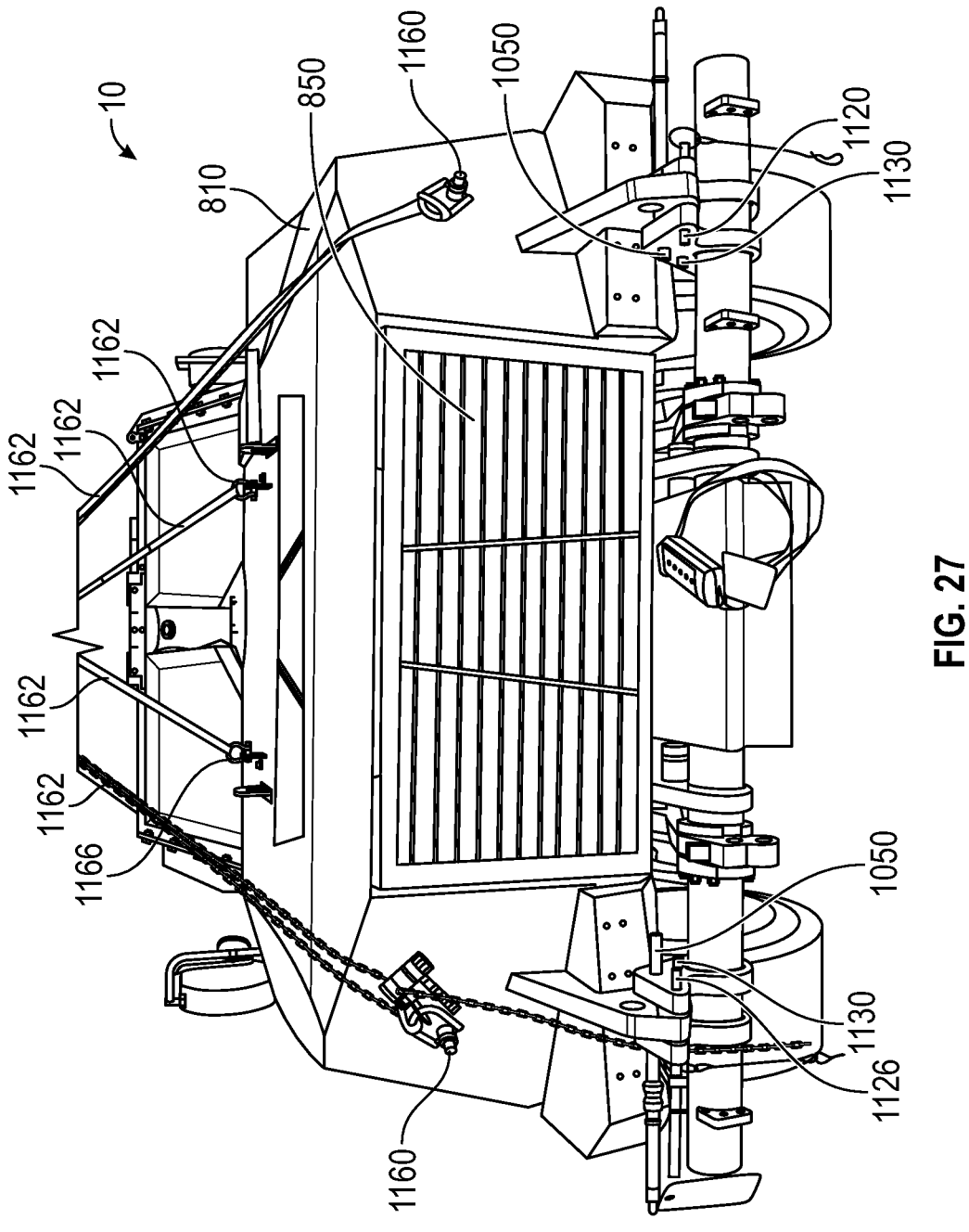
FIGS. 27, 28, and 29 are various views of the vehicle of FIG. 1 in the B-Kit configuration of FIG. 10 with the hood assembly partially disassembled.
Figure 28:
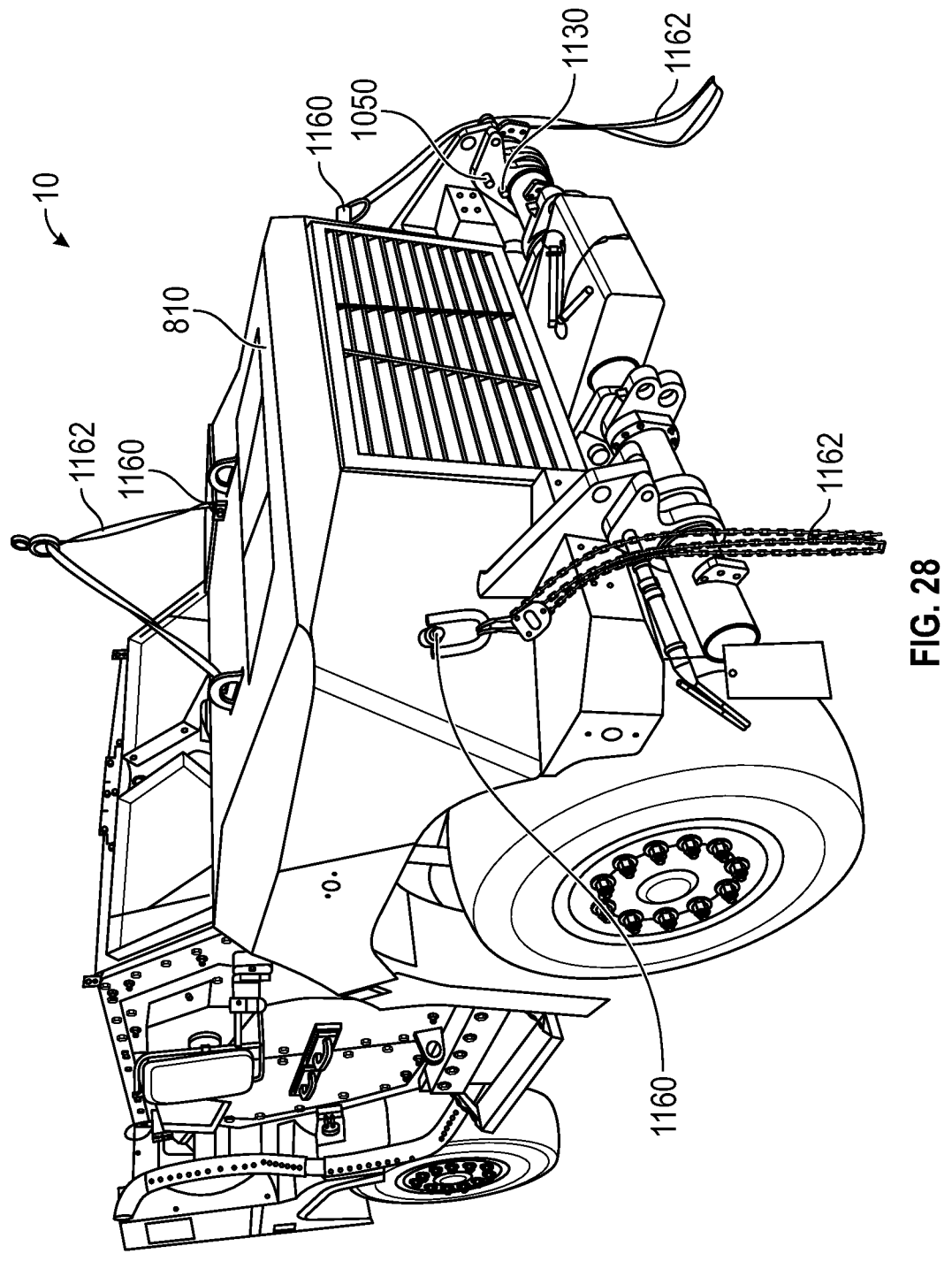
Figure 29:
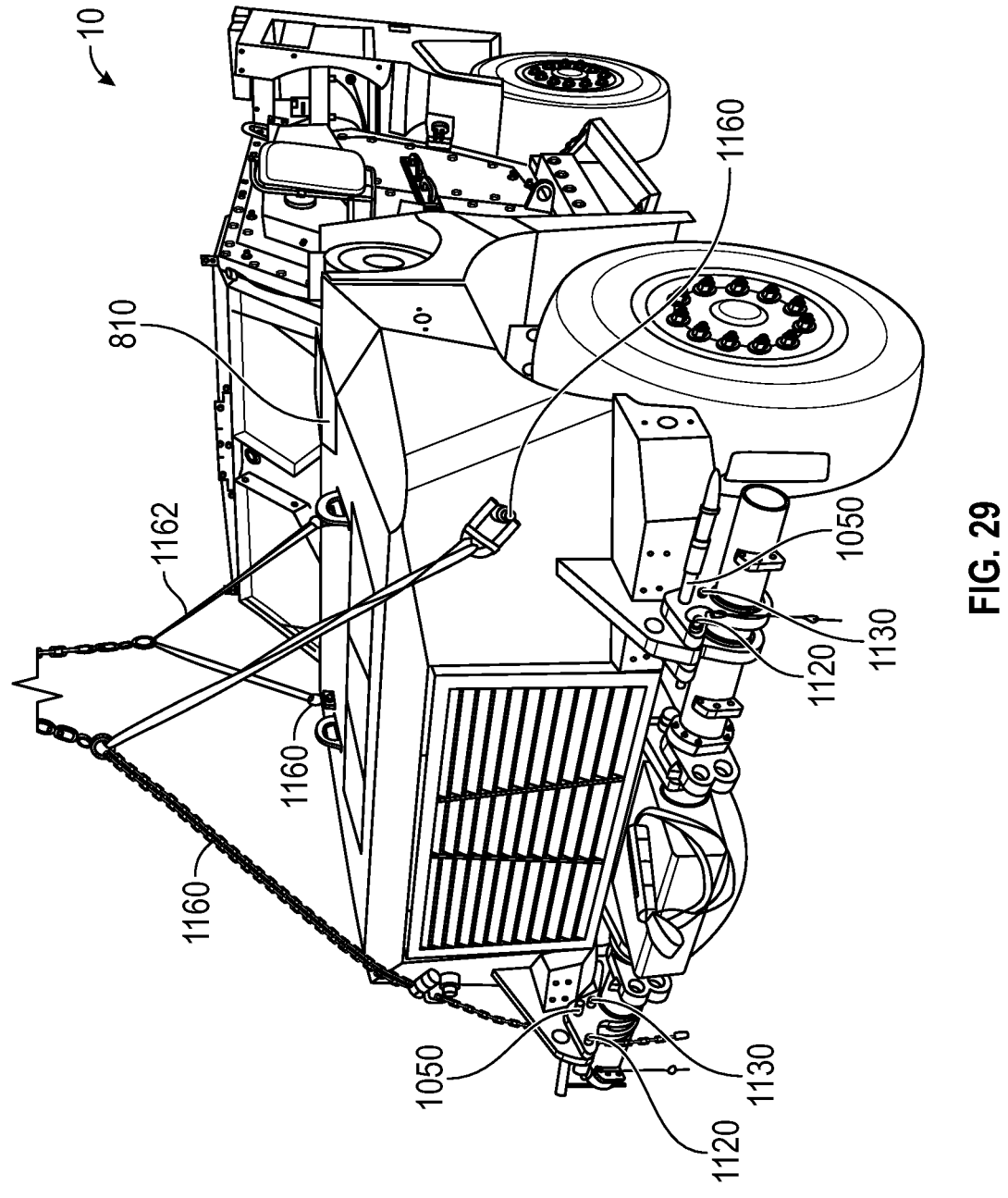

Referring to FIG. 22, the stop apertures 1112 of the side plate 1020 are configured to receive a stop pin 1130 (e.g., as shown in FIGS. 27-29) therethrough. The stop pin 1130 may engage a bottom surface of the center plate 1010 when the hood 810 is in the closed position. In such a configuration, the stop pin 1130 may support a portion of the weight of the hood 810. This may reduce the weight supported by the locking pin 1120 in the closed configuration, facilitating removal and replacement of the locking pin 1120.

Referring to FIGS. 10-19, the vehicle 10 includes a pair of locking assemblies, shown as latches 1140, that selectively hold the hood 810 in the closed position. Each latch 1140 includes a first portion, shown as body portion 1142, and a second portion, shown as hood portion 1144. The body portion 1142 is fixedly coupled to a portion of the front subframe 310. The hood portion 1144 is fixedly coupled to the hood 810. When the body portion 1142 is engaged with the hood portion 1144, the latch 1140 is engaged and limits (e.g., prevents) movement of the hood 810 relative to the front subframe 310. When the body portion 1142 is disengaged from the hood portion 1144, the latch 1140 is released or disengaged, and the latch 1140 permits movement of the hood 810.

Figure 23:
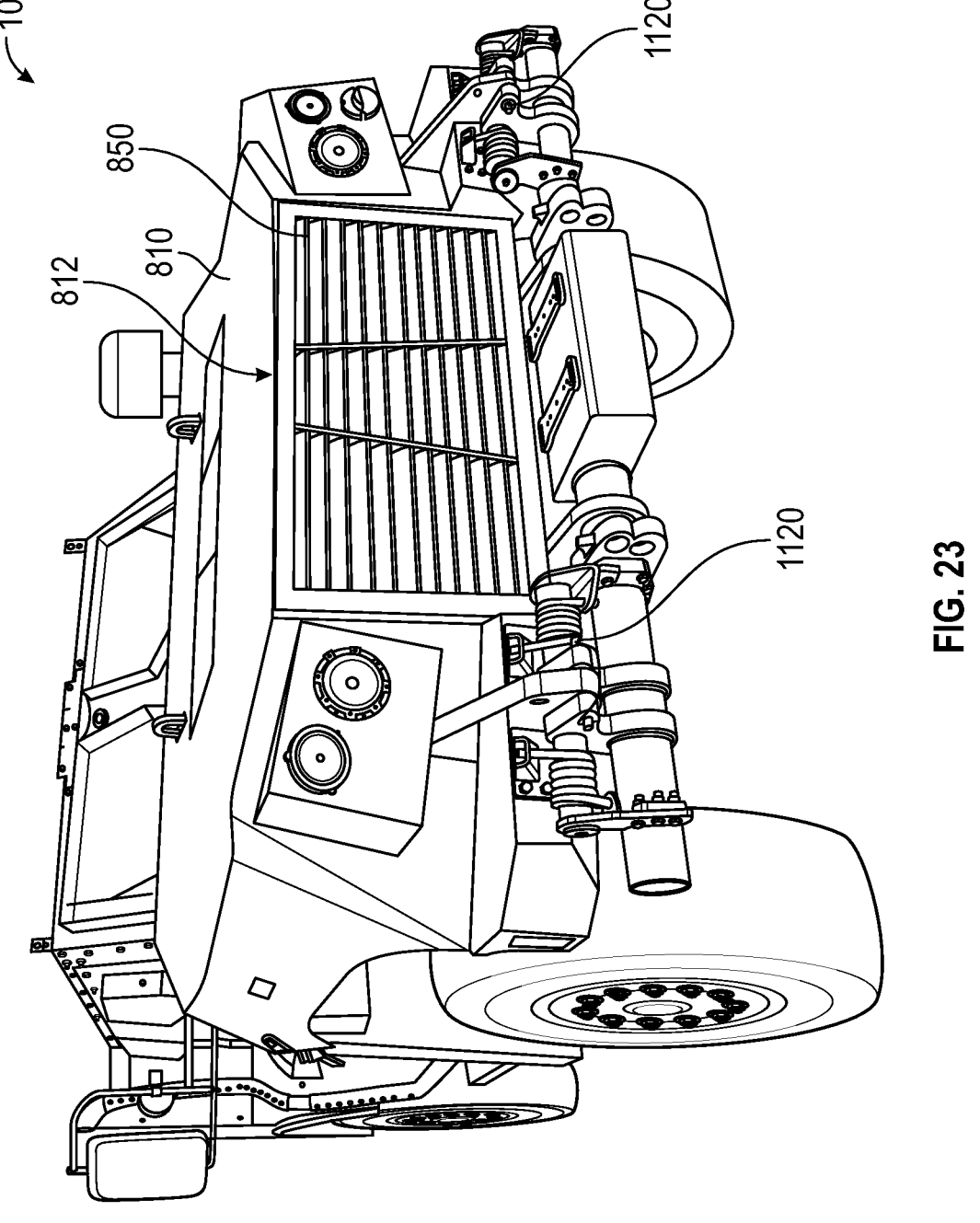
FIG. 23 is a front perspective view of the vehicle of FIG. 1 in the B-Kit configuration of FIG. 10 with the hood in a locked closed configuration.
Figure 24:
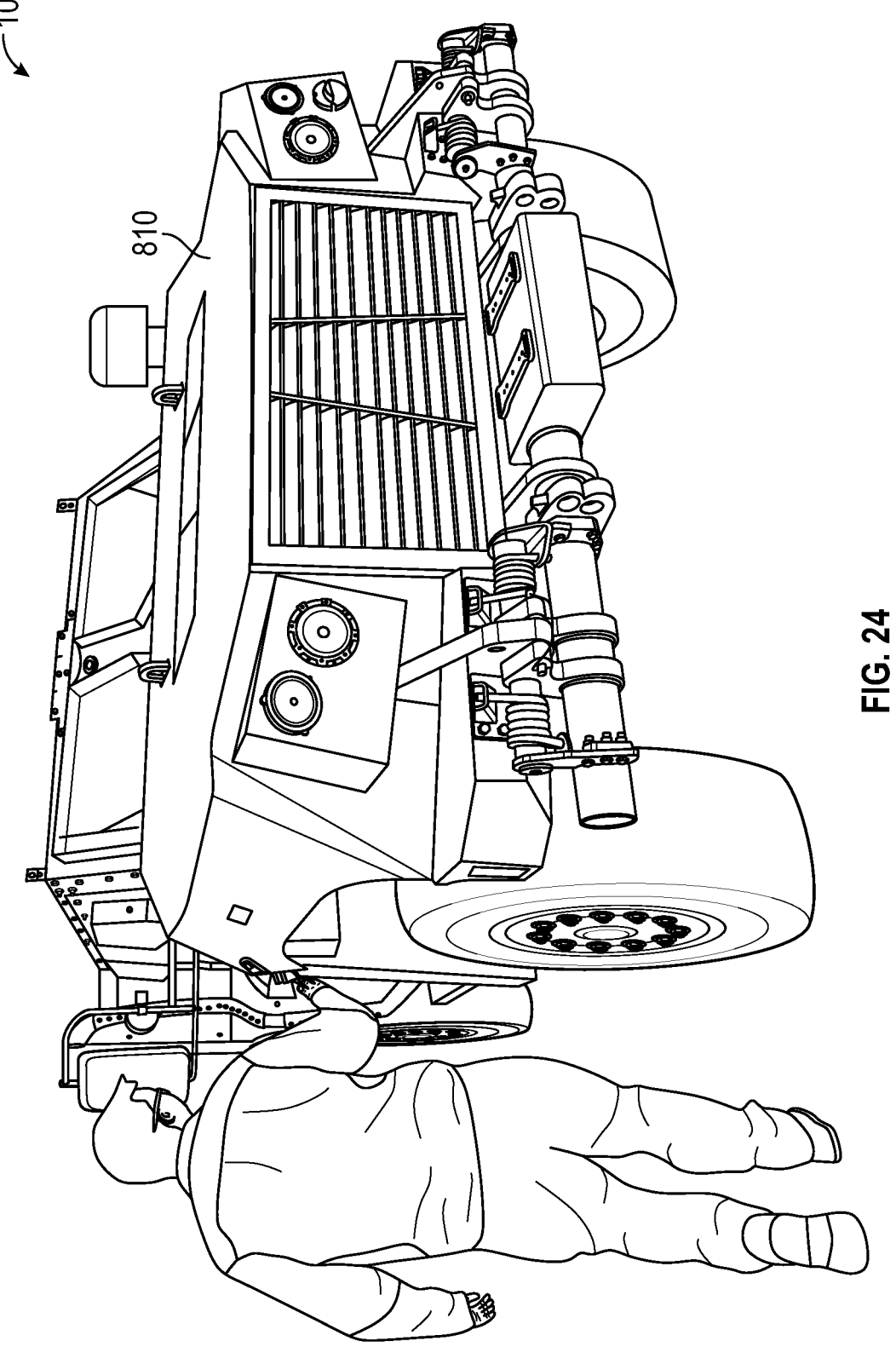
FIG. 24 is a front perspective view of the vehicle of FIG. 1 in the B-Kit configuration of FIG. 10 with the hood in an unlocked closed configuration.
Figure 25:
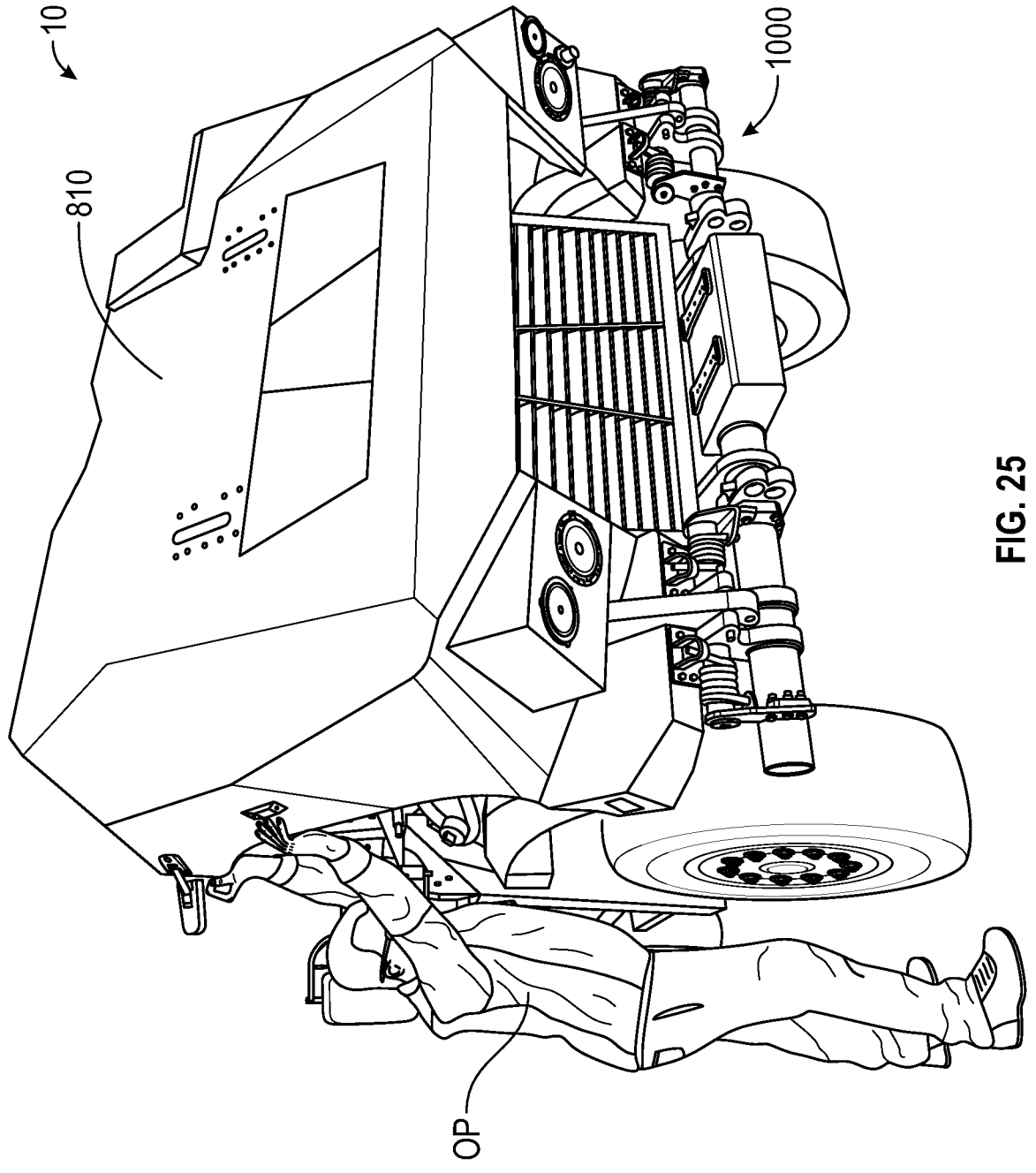
FIG. 25 is a front perspective view of the vehicle of FIG. 1 in the B-Kit configuration of FIG. 10 with the hood in an unlocked open configuration.
Figure 26:
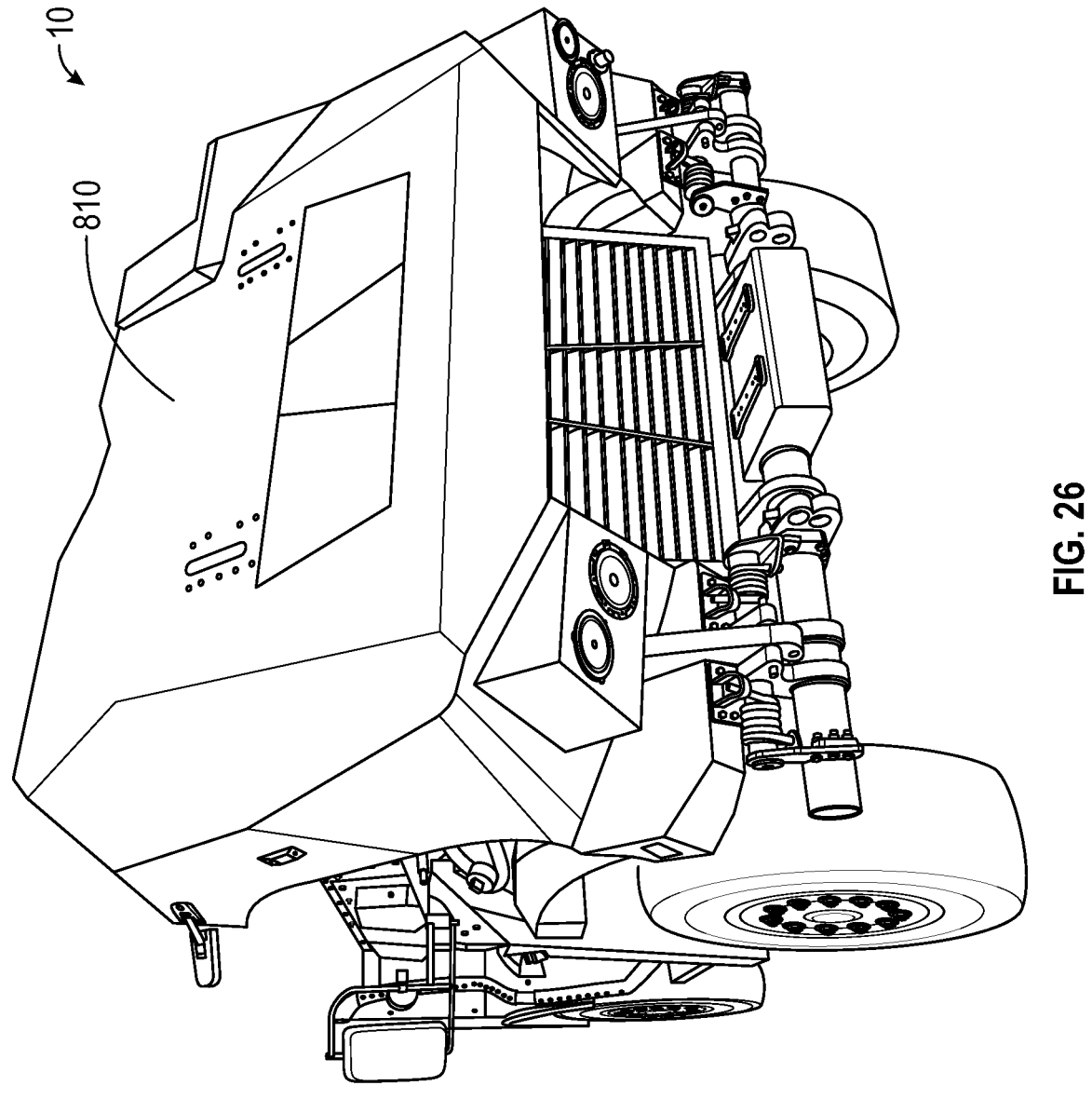
FIG. 26 is a front perspective view of the vehicle of FIG. 1 in the B-Kit configuration of FIG. 10 with the hood in a locked open configuration.

FIGS. 23-26 illustrate the process of reconfiguring the hood 810 between the closed position and the open position. In FIG. 23, the hood 810 is in the closed position, the latches 1140 are engaged, and the locking pins 1120 are inserted through the closed pin apertures 1100 and the pin apertures 1110. Accordingly, the hood 810 is held in the closed position (e.g., the hood 810 is in a locked closed configuration). In FIG. 24, the locking pins 1120 are removed and the latches 1140 are disengaged. Accordingly, the hood 810 is in the closed position but could freely be lifted (e.g., the hood 810 is in an unlocked closed configuration). In FIG. 25, an operator OP lifts the hood 810 into the open position, the locking pins 1120 remain removed, and the latches 1140 remain disengaged. Accordingly, the hood 810 is in the open position but could freely be lowered (e.g., the hood 810 is in an unlocked open configuration). In FIG. 26, the locking pins 1120 are inserted through the open pin apertures 1102 and the pin apertures 1110, and the latches 1140 remain disengaged. Accordingly, the hood 810 is held in the open position (e.g., the hood 810 is in a locked open configuration). This process may be reversed to reconfigure the hood

810 from the open position to the closed position. Throughout the movement of the hood 810, the grille 850 may remain stationary.

FIGS. 27-29 illustrate the hood assembly 800 in a partially disassembled configuration. In this configuration, a pair of headlamp assemblies, shown in FIG. 10 as headlight assemblies 1150, are removed from the hood 810. The spring support plates 1070 and the torsion springs 1160 are removed. A series of fasteners, shown as lift points 1160, are removably coupled to the hood 810. The lift points 1160 facilitate selective engagement of the hood 810 with a set of chains or straps, shown as lift members 1162. The lift members 1162 may facilitate engagement with a hoist to lift the hood 810 while assembling or disassembling the hood assembly 800.

To reconfigure the vehicle 10 from the A-Kit configuration to the B-Kit configuration, the hood 320 may first be disconnected from the vehicle 10. The grille 850 may be coupled to the front subframe 310. The flanges 1042 may be coupled (e.g., fastened) to the tow plates 1034. To reconfigure the vehicle 10 from the B-Kit configuration to the A-Kit configuration, this process may be reversed.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the hull and frame assembly 100, the driveline 600, the electric motor 700, the hood 320, the hood 800, etc.) as shown in the various exemplary embodiments is illustrative only. Additionally, any element disclosed in one embodiment may be incorporated or utilized with any other embodiment disclosed herein.

What is claimed is:

1. A vehicle comprising:
   a chassis;
   a tractive element coupled to the chassis;
   a hood; and
   a hinge assembly pivotally coupling the hood to the chassis, the hinge assembly including:
       a first plate fixedly coupled to the hood, the first plate defining a first hinge pin aperture;
       a second plate coupled to the chassis, the second plate defining a second hinge pin aperture;
       a hinge pin extending through the first hinge pin aperture and the second hinge pin aperture; and
       a spring configured to bias the hood toward a raised position;
       wherein the first plate defines a first locking pin aperture, wherein the second plate defines a second locking pin aperture, and wherein the hinge assembly includes a locking pin configured to be received by the first locking pin aperture and the second locking pin aperture to selectively limit movement of the hood relative to the chassis;
       wherein the locking pin is configured to be received by the first locking pin aperture and the second locking pin aperture to selectively hold the hood in the raised position; and
       wherein the hood is repositionable between the raised position and a lowered position below the raised position, wherein the first plate further defines a third locking pin aperture, and wherein the locking pin is configured to be received by the third locking pin aperture and the second locking pin aperture to selectively hold the hood in the lowered position.

2. A vehicle comprising:
   a chassis;
   a tractive element coupled to the chassis;
   a hood; and
   a hinge assembly pivotally coupling the hood to the chassis, the hinge assembly including:
       a first plate fixedly coupled to the hood, the first plate defining a first hinge pin aperture;
       a second plate coupled to the chassis, the second plate defining a second hinge pin aperture;

a hinge pin extending through the first hinge pin aperture and the second hinge pin aperture; and
       a spring configured to bias the hood toward a raised position, wherein the spring is a first torsion spring, the hinge assembly further comprising a second torsion spring configured to bias the hood towards the raised position, wherein the hinge pin extends through the first torsion spring and the second torsion spring, and wherein the first plate is received between the first torsion spring and the second torsion spring.

3. The vehicle of claim 2, wherein the hinge assembly further includes a frame member removably coupled to the chassis, and wherein the second plate is fixedly coupled to the frame member.

4. The vehicle of claim 3, wherein the chassis includes a tow plate positioned at a front end of the vehicle, wherein the frame member is removably coupled to the tow plate and extends laterally outward from the tow plate, and wherein the tow plate defines a tow aperture.

5. The vehicle of claim 3, wherein the spring is a torsion spring, and wherein the hinge pin extends through the torsion spring.

6. The vehicle of claim 5, wherein the torsion spring includes a first leg and a second leg, and wherein the hinge assembly further includes:
   a first stop coupled to the hood and engaging the first leg; and
   a second stop coupled to the frame member and engaging the second leg.

7. The vehicle of claim 6, wherein the hinge assembly further includes a support coupled to (a) at least one of the hood or the frame member and (b) coupled to the hinge pin, and wherein the torsion spring extends between the second plate and the support.

8. The vehicle of claim 7, wherein the hinge assembly further includes a third plate fixedly coupled to the frame member and coupled to the hinge pin, and wherein the first plate extends between the second plate and the third plate.

9. The vehicle of claim 7, wherein the support is fixedly coupled to the frame member.

10. The vehicle of claim 9, wherein the second stop is fixedly coupled to the support.

11. The vehicle of claim 2, wherein the first plate defines a first locking pin aperture, wherein the second plate defines a second locking pin aperture, and wherein the hinge assembly includes a locking pin configured to be received by the first locking pin aperture and the second locking pin aperture to selectively limit movement of the hood relative to the chassis.

12. The vehicle of claim 11, wherein the locking pin is configured to be received by the first locking pin aperture and the second locking pin aperture to selectively hold the hood in the raised position.

13. The vehicle of claim 12, wherein the hood is repositionable between the raised position and a lowered position below the raised position, wherein the first plate further defines a third locking pin aperture, and wherein the locking pin is configured to be received by the third locking pin aperture and the second locking pin aperture to selectively hold the hood in the lowered position.

14. The vehicle of claim 2, further comprising a third plate coupled to the chassis and defining a third hinge pin aperture that receives the hinge pin, wherein the first plate extends between the second plate and the third plate, and wherein the second plate and the third plate extend between the first torsion spring and the second torsion spring.

15. The vehicle of claim 14, further comprising a pair of supports each coupled to the hinge pin and at least one of the hood or the chassis, wherein the first torsion spring and the second torsion spring are received between the supports.

16. The vehicle of claim 2, further comprising a driver coupled to the chassis and configured to drive the tractive element to propel the vehicle, wherein the hood a least partially defines a chamber containing the driver.

17. The vehicle of claim 16, further comprising a grille fixedly coupled to the chassis and at least partially defining the chamber, wherein the hood is configured to move relative to the grille.

18. The vehicle of claim 2, wherein the hood is a first hood, wherein the vehicle is reconfigurable between (a) a first configuration in which the hinge assembly couples the first hood to the chassis and (b) a second configuration in which the hinge assembly and the first hood are removed and a second hood is coupled to the chassis, and wherein the first hood provides a greater damage resistance than the second hood.

19. A vehicle comprising:
a chassis;

a tractive element coupled to the chassis;
a hood; and
a hinge assembly pivotally coupling the hood to the chassis, the hinge assembly including:
  a first plate fixedly coupled to the hood, the first plate defining a first hinge pin aperture;
  a second plate coupled to the chassis, the second plate defining a second hinge pin aperture;
  a hinge pin extending through the first hinge pin aperture and the second hinge pin aperture; and
  a spring configured to bias the hood toward a raised position;
wherein the hood is a first hood, wherein the vehicle is reconfigurable between (a) a first configuration in which the hinge assembly couples the first hood to the chassis and (b) a second configuration in which the hinge assembly and the first hood are removed and a second hood is coupled to the chassis, and wherein the first hood provides a greater damage resistance than the second hood.

* * * * *